US007842767B2

(12) United States Patent
Côté

(10) Patent No.: US 7,842,767 B2
(45) Date of Patent: Nov. 30, 2010

(54) POLYETHER BASED MONOMERS AND HIGHLY CROSS-LINKED AMPHIPHILE RESINS

(75) Inventor: Simon Côté, Beauport (CA)

(73) Assignee: Matrix Innovation Inc., Montreal, Quebec (CA)

( * ) Notice: Subject to any disclaimer, the term of this patent is extended or adjusted under 35 U.S.C. 154(b) by 743 days.

(21) Appl. No.: 10/567,430

(22) PCT Filed: Aug. 4, 2004

(86) PCT No.: PCT/CA2004/001461

§ 371 (c)(1),
(2), (4) Date: Apr. 25, 2006

(87) PCT Pub. No.: WO2005/012277

PCT Pub. Date: Feb. 10, 2005

(65) Prior Publication Data

US 2006/0241245 A1 Oct. 26, 2006

Related U.S. Application Data

(60) Provisional application No. 60/491,969, filed on Aug. 4, 2003.

(51) Int. Cl.
*C08F 290/06* (2006.01)
*C08F 299/02* (2006.01)
*C08F 16/34* (2006.01)

(52) U.S. Cl. .................. 526/315; 526/333; 526/320; 526/304; 526/329.4; 526/334

(58) Field of Classification Search ............... 526/333, 526/320, 304, 329.4, 315, 334
See application file for complete search history.

(56) References Cited

U.S. PATENT DOCUMENTS

| 2,201,074 | A | * | 5/1940 | Britton et al. ............... 568/616 |
| 4,908,405 | A |   | 3/1990 | Bayer et al. |
| 5,466,758 | A |   | 11/1995 | Yoon-Sik et al. |
| 5,910,554 | A |   | 6/1999 | Kempe et al. |
| 6,476,092 | B1 | * | 11/2002 | Kunita .......................... 522/31 |
| 6,787,622 | B2 | * | 9/2004 | Kunita ......................... 526/257 |
| 7,235,297 | B2 | * | 6/2007 | Cote .......................... 428/402 |
| 2003/0114546 | A1 | * | 6/2003 | Satake et al. .................. 521/50 |

FOREIGN PATENT DOCUMENTS

| EP | 0 633 912 B1 | 1/1995 |
| EP | 0 692 501 A1 | 1/1996 |
| EP | 1 288 272 A1 | 3/2003 |
| JP | 2002105128 A * | 4/2002 |
| WO | 93/16118 A1 | 8/1993 |
| WO | 97/27226 A2 | 7/1997 |
| WO | 99/64484 A1 | 12/1999 |
| WO | 00/18823 A2 | 4/2000 |
| WO | 02/40559 A2 | 5/2002 |
| WO | 03/102040 A1 | 12/2003 |
| WO | 2004/014984 A1 | 2/2004 |

OTHER PUBLICATIONS

Maria Kempe et al., "Clear: A Novel Family of Highly Cross-Linked Polymeric Supports for Solid-Phase Peptide Synthesis", J. Am. Chem. Soc., 1996, vol. 118, pp. 7083-7093, American Chemical Society.

Morten Meldal et al., "PEGA: A Flow Stable Polyethylene Glycol Dimethyl Acrylamide Copolymer for Solid Phase Synthesis", Tetrahedron Letters, 1992, vol. 33, No. 21, pp. 3077-3080.

Ernst Bayer, "Towards the Chemical Synthesis of Proteins", Angewandte Chemie, International Edition in English, Feb. 1991, vol. 30, No. 2, pp. 113-219.

Owen W. Gooding et al., "On the Development of New Poly(Styrene-Oxyethylene) Graft Copolymer Resin Supports for Solid-Phase Organic Synthesis", Journal of Combinatorial Chemistry, 1999, vol. 1, No. 1, pp. 113-122, American Chemical Society.

Manat Renil et al., "POEPOP and POEPS: Inert Poyethylene Glycol Crosslinked Polymeric Supports for Solid Synthesis", Tertrahedron Letters, 1996, vol. 37, No. 34, pp. 6185-6188, Elsevier Science Ltd., Great Britain.

Jörg Rademann, et al., "SPOCC: A Resin for Solid-Phase Organic Chemistry and Enzymatic Reactions on Solid Phase", J. Am. Chem. Soc., 1999, vol. 121, No. 23, pp. 5459-5466, American Chemical Society.

Morten Grøtli et al., "Surfactant Mediated Cationic and Anionic Suspension Polymerization of PEG-Based Resins in Silicon Oil: Beaded SPOCC 1500 and POEPOP 1500", Journal of Combinatorial Chemistry, 2001, vol. 3, No. 1, pp. 28-33, American Chemical Society.

Christian W. Tornøe et al., "EXPO$_{3000}$—A New Expandable Polymer for Synthesis and Enzymatic Assays", Tetrahedron Letters, 2002, vol. 43, pp. 6409-6411, Elsevier Science Ltd.

(Continued)

*Primary Examiner*—Randy Gulakowski
*Assistant Examiner*—Rachel Kahn
(74) *Attorney, Agent, or Firm*—Timothy J. Keefer; Paul A. Jenny; Polsinelli Shughart PC

(57) ABSTRACT

The present invention relates to a cross-linked polyether which is obtained by polymerization of at least one monomer selected from the group consisting of (a) (α-X-methyl) vinyl-EWG, (α-X-methyl) vinyl-ERG, or (α-X-methyl) vinyl-aryl, where X is oxygen, sulfur, PEG, PPG or poly (THF); (b) a monomer which is polymerizable with a PEG, PPG or poly (THF) cross-linker having at least one (α-X-methyl) vinyl-EWG, (α-X-methyl) vinyl-ERG or (α-X-methyl) vinyl-aryl, where X is oxygen, sulfur, PEG, PPG, or poly (THF); (c) a PEG, PPG, or poly (THF) cross-linker having at least an acrylamide or a methacrylamide end group; and (d) mixtures thereof. Various monomers, resins and methods for preparing such cross-linked polyethers are also disclosed.

2 Claims, 5 Drawing Sheets

OTHER PUBLICATIONS

Yoshiyuki Miwa et al., "New Type Polymer Electrolytes Based on Bis-Oxetane Monomer With Oligo(Ethylene Oxide) Units", Polymer Journal, 2001, vol. 33, No. 12, pp. 927-933.

Dörwald, "Chapter 2: Supports for Solid-Phase Organic Synthesis", 2000, pp. 13-32, Wiley-VCH Verlag Weinheim, Germany.

Morten Meldal, "Properties of Solid Supports", Methods in Enzymology, 1997, vol. 289, pp. 83-104, Academic Press, NY.

Dongri Chao et al., "Poly(Ethylene Oxide) Macromonomers IX. Synthesis and Polymerization of Macromonomers Carrying Styryl End Groups With Enhanced Hydrophobicity", Polymer Journal, 1991, vol. 23, No. 9, pp. 1045-1052.

Bunichiro Yamada et al., Role of Bulky α-Substituent in Free-Radical Polymerization and Copolymerization of Methyl α-(Alkoxymethyl) Acrylates, Makromol. Chem., 1991, vol. 192, pp. 2713-2722, Hüthig & Wepf Verlag.

Bunichiro Yamada et al., "Polymerization of 2-(Substituted Methyl)Acrylate Bearing ω-Methoxyoligoethyleneoxy Groups As Side Chains to New Low Tg Polymer", Journal of Polymer Science: Part A: Polymer Chemistry, 1993, vol. 31, pp. 3433-3438, John Wiley & Sons, Inc.

Takashi Tsuda et al., "New Dicyano-Containing Cyclopolymers Having High Stereoregularity Derived From Dimethacrylmalononitrile", Macromolecules, 1993, vol. 26, pp. 6359-6363, American Chemical Society.

Chetan P. Jariwala et al., "Syntheses, Polymerization, and Characterization of Novel Semifluorinated Methacrylates, Including Novel Liquid Crystalline Materials", Macromolecules, 1993, vol. 26, pp. 5129-5136, American Chemical Society.

Annie Philippon et al., "Macrocyclic Ethers by Free Radical Cyclizations", Synthetic Communications, 1997, vol. 27, No. 15, pp. 2651-2682, Marcel Dekker, Inc.

Bunichiro Yamada et al., "Radical Polymerization, Co-Polymerization, and Chain Transfer of α-Substituted Acrylic Esters", Prog. Polym. Sci., Pergamon, 1994, vol. 19, pp. 1089-1131, Elsevier Science Ltd., Great Britain.

Koichi Ito, et al., "Poly(Ethylene Oxide) Macromonomers. 10. Characterization and Solution Properties of the Regular Comb Polymers With Polystyrene Main Chains and Poly(Ethylene Oxide) Side Chains", Macromolecules, 1992, vol. 25, pp. 1534-1538, American Chemical Society.

Ryoko Kita et al., "Hydrophilic Polymer Supports for Solid-Phase Synthesis: Preparation of Poly(Ethylene Glycol) Methacrylate Polymer Beads Using "Classical" Suspension Polymerization in Aqueous Medium and Their Application in the Solid-Phase Synthesis of Hydantoins", Journal of Cominatorial Chemistry, 2001, vol. 3, No. 6, pp. 564-571, American Chemical Society.

Byeong-Deog Park et al., "Convenient Method for Preparing Polystyren Havng β-Hydroxy Group: Its Application to the Synthesis of Polyethylene Glycol-Grafted Polystyrene Resin", Tetrahedron Letters, 1997, vol. 38, No. 4, pp. 591-594, Elsevier Science Ltd., Great Britain.

International Search Report dated Dec. 24, 2004.

Written Opinion of the International Searching Authority dated Dec. 24, 2004.

* cited by examiner

POLYETHER BASED MONOMERS AND HIGHLY CROSS-LINKED AMPHIPHILE RESINS

This application claims priority under 35 U.S.C. §119(e) to US Provisional Application Ser. No. 60/491,969, filed Aug. 4, 2003, and under 35 U.S.C. §120 to PCT Application No. PCT/CA2004/001461 filed as an International Application on Aug. 4, 2004 designating the U.S., the entire contents of which are hereby incorporated by reference in their entireties.

TECHNICAL FIELD

The invention relates to cross-linked polyethers and methods for preparing these polymers. These polyethers can be used as polymeric support in bioorganic or organic chemistry.

BACKGROUND OF THE INVENTION

The search for more stable amphiphilic resins is nowadays needed. Most of the presently known resins of this kind are based on polystyrene-PEG, polyamide, polyester or any kind of polymerized vinylic core. Their main drawback is their low chemical stability. CLEAR® (Kempe et al., (1996), J. Am. Chem. Soc., 118, 7083-7093 and (1999), U.S. Pat. No. 5,910, 554) and PEGA® (Meldal, (1992), Tetrahedron Lett., 33, 3077-3080 and (1993), WO 93/16118) resins are cleaved in nucleophilic conditions (e.g. hydrolytic) as TENTAGEL® (Bayer, (1990), U.S. Pat. No. 4,908,405 and (1991), Angew. Chem. Int. Ed. Engl. 30, 113-129) in acidic media.

Resins based on primary ether bound can be used to solve some problems, however other problems remain. The presence of the polystyrene core limits the ability of the final resin to perform for example the standard Friedel-Crafts reaction and generally have low loading capacity (e.g. between 0.2 and 0.5 mmol/g to ARGOGEL®) (Labadie et al., (1997), WO 97/27226 and Gooding et al., (1999), J. Comb. Chem., 1, 113-123). Reaching higher loadings lowers the final amphiphilicity of the resin because the PEG content is decreasing proportionally (e.g. Rapp Polymere's HYPO-GEL®).

Few examples of non-polystyrene-PEG based resins are known. Meldal showed the usefulness of the POEPOP resin (Renil et al., (1996), Tetrahedron Lett., 37, 6185-6188) based on PEG epoxide, and the SPOCC (Rademann et al., (1999), J. Am. Chem. Soc., 121, 5459-5466 and Meldal et al., (2000), WO 00/18823) based on PEG oxetane. Unfortunately, the use of non-conventional polymerization conditions with silicone oil and an appropriate surfactant gives a high cost manufacturing process (Grøtli et al., (2001), J. Comb. Chem., 3, 28-33). Furthermore, low loadings are obtained when higher cross-linker (CL) content is used to give better mechanical stability. EXPO$_{3000}$ (Tornøe et al., (2002), Tetrahedron Lett., 43, 6409-6411) is a derivative of the former SPOCC resin based on PEG dioxetane with a silylated CL that gives a high amphiphilic resin employed in synthesis and enzymatic assays.

Recently, Oishi (Miwa et al., (2001), Polymer Journal, Vol. 33, No. 12, 927-933) showed the use of a similar oxetane based on POE as a new polymer electrolyte for lithium batteries. The polymerization process is induced by LiBF$_4$ (or LiPF$_6$ as further electrolyte). The final polymer is nevertheless not in a beaded form and not employed for any organic chemistry reaction. The difference between the Meldal's monomers (used for the SPOCC synthesis) and the ones presented in Oishi's article is the nature of the methyl group replaced by a ethyl one.

The use of divinylether as CL gives secondary ethers that are more susceptible to hydrolysis such as the Meldal's POE-POP. Finally, PEG diallylethers (known to give low molecular weight polymers) would give low mechanical stability polymers containing only primary ethers. The PEG vinyl ketone (that will be later reduced) offers an interesting alternative to polyether with primary ether having the right specifications.

Dörwald (Dörwald, (2000), Organic Synthesis on Solid Phase, Chap. 2. Wiley-VCH Verlag, Weinheim, Federal Republic of Germany), Meldal (Meldal, (1997), Methods in enzymology, 289, 83-104, Academic Press, N.Y.) and Côté (Côté, (2002), WO 02/40559) offer more exhaustive reviews on amphiphilic resins.

The following specifications are required for a new and low-cost amphiphilic resin:
PEG based;
Primary ethers only (chemical stability);
High loadings available;
Solid to waxy state (non-sticky);
Mechanical stability;
Normal suspension polymerization (in water);
Low manufacturing cost (commercial products).

PEG macromonomers had been investigated in the early 90' until today by several groups. Ito (Chao et al., (1991), Polym. J., Vol. 23, 1045-1052) reported the synthesis and the polymerization behavior of several styrenic and standard methacrylic PEG monomers covering most of the amphiphilic resins found today.

Yamada (Yamada et al., (1991), Makromol. Chem., 192, 2713-2722; and (1993), J. Polym. Sci. Part A: Polym. Chem., Vol. 31, 3433-3438) took another approach: the (α-PEG-methyl)acrylates. New amphiphilic monomers were synthesized and studied in copolymerization with methyl methacrylate and styrene. Unfortunately, very short methoxy-PEG chains of 1 to 3 EO were used, thus limiting the real amphiphilic potential of the final polymer. Moreover, only soluble linear polymers were reported and furthermore without any commercial uses.

Mathias reported new types of CL based on (α-Y-methyl) acrylates (where Y=malonitrile) (Tsuda, T. et al., (1993), Macromol., Vol. 26, 6359-6363); and tetraethylene glycol di(α-fluoroalkoxy-methyl)acrylate (Jariwala, C. P. et al., (1993), Macromol. Vol. 26, 5129-5136). Moreover, Mathias showed how theses short CL have the tendency to cyclopolymerize instead of "really" cross-link.

Maillard (Philippon et al., (1997) brings new approaches to synthesize macrocycles (mainly crown ethers). By the use of short PEG-acrylate and (α-PEG-methyl)acrylate (3 EO units only) that are submitted to radical reductive conditions (with Bu$_3$SnH), several crown ethers were obtained.

Finally, no example of monomers, CL and beaded insoluble polymers based on (α-PEG-methyl)acrylates has been published (review of Yamada et al., (1994), Progr. Polym. Sci., Vol. 19, 1089-1131).

It is an object of the present invention to provide a simple monomer design to give maximum loading on the final polymerized material versus known monomers and CL (cross-linker). Usual solid supports are synthesized by the mean of monomers and CL that contain:

-continued

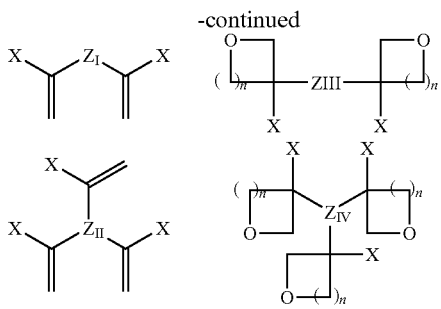

where:
X=H and/or CH$_3$;
Y=EWG (electron withdrawing group) and/or aryls with anything linked to it;
Z, Z$_{III}$ and Z$_{IV}$=anything;
Z$_I$,=EWG-spacer-EWG;
Z$_{II}$=(EWG)$_2$-spacer-EWG;
n=0 or 1.

It is an object of the present invention to provide the use of high percentage of CL without affecting the final loading of the resulting polymer contrary to what is presently found in the literature. As mentioned above, amphiphilic resins are using standard acrylates, methacrylates, acrylamides and/or methacrylamides where high CL content is needed to obtain a non-sticky polymer. This problem occurs also in the case of epoxide and/or oxetane based polymers.

It is an object of the present invention to provide high functionalized monomers, cross-linkers, and polymers. Bifunctional monomers or CL are known (e.g. fumaric, maleic and itaconic acid based) but each is susceptible to hydrolysis and/or nucleophilic attack. Divinylbenzene is also a bifunctional CL but no chemical fucntion is still available once polymerized.

It is an object of the present invention to provide a stable polymer which can be used further as handle, linker and/or spacer for SPPS (Solid Phase Peptide Synthesis) and SPOS (Solid Phase Organic Synthesis).

It is an object of the present invention to provide highly functionalized non hydrolysable CL.

It is another object of the present invention to provide a new type of monomer based on the use of epoxides or oxetane groups. Theses groups could be lately derivatized in other CF and/or linkers found in SPPS and/or SPOS before and/or after polymerization.

It is another object of the present invention to provide polymeric solid supports that can be used for the solid phase synthesis of peptides, oligonucleotides, oligosaccharides and in combinational and traditional organic chemistry.

It is another object of the present invention to provide resins that can be used in liquid phase synthesis, chromatography, for scavenging purposes, and for protein and reagents immobilisation.

SUMMARY OF THE INVENTION

According to a first aspect of the invention, there is provided a cross-linked polyether which is obtained by polymerization of at least one monomer selected from the group consisting of
a) (α-X-methyl)vinyl-EWG, (α-X-methyl)vinyl-ERG, or (α-X-methyl) vinyl-aryl, where X is oxygen, sulfur, PEG, PPG or poly(THF);

b) a monomer which is polymerizable (preferably monomers such as styrenes, divinylbenzenes, acrylates, methacrylates, acrylamides, methacrylamides, styrenes, acroleins, vinyl ketones, maleimides, etc.) with a PEG, PPG or poly(THF) cross-linker having at least one (α-X-methyl)vinyl-EWG, (α-X-methyl)vinyl-ERG or (α-X-methyl)vinyl-aryl, where X is oxygen, sulfur, PEG, PPG, or poly(THF);

c) a PEG, PPG, or poly(THF) cross-linker having at least an acrylamide or a methacrylamide end group; and d) mixtures thereof.

In (c), the acrylamide or a methacrylamide can eventually be reduced, once polymerized, to a polyamine. Alternatively, at least two and preferably at least three of these monomers can be copolymerized.

According to a second aspect of the invention, there is provided a cross-linked polyether which is obtained by polymerization of at least one monomer selected from the group consisting of
a) an α,α'-X-Y-epoxide, or an α,α'-X-Y-oxetane, where X is oxygen, sulfur, PEG, PPG, or poly(THF) and Y is selected from the group consisting of C$_3$ to C$_{50}$ (preferably C$_3$ to C$_{12}$) unsubstituted linear or branched alkanes, C$_1$ to C$_{50}$ (preferably C$_1$ to C$_{12}$) substituted linear or branched alkanes, C$_3$ to C$_{50}$ (preferably C$_3$ to C$_{12}$) unsubstituted linear or branched arylalkanes, C$_2$ to C$_{50}$ (preferably C$_2$ to C$_{12}$) substituted linear or branched arylalkanes, C$_1$ to C$_{30}$ (preferably C$_4$ to C$_{12}$) substituted or unsubstituted aryls; and b) a monomer which is polymerizable (preferably monomers such as styrenes, divinylbenzenes, acrylates, methacrylates, acrylamides, methacrylamides, styrenes, acroleins, vinyl ketones, maleimides, etc.) with a PEG, PPG or poly(THF) cross-linker having at least one α,α'-X-Y-epoxide or α,α'-X-Y-oxetane, where X is oxygen, sulfur, PEG, PPG or poly(THF), and Y is selected from the group consisting of C$_3$ to C$_{50}$ (preferably C$_3$ to C$_{12}$) unsubstituted linear or branched alkanes, C$_1$ to C$_{50}$ (preferably C$_1$ to C$_{12}$) substituted linear or branched alkanes, C$_3$ to C$_{50}$ (preferably C$_3$ to C$_{12}$) unsubstituted linear or branched arylalkanes, C$_2$ to C$_{50}$ (preferably C$_2$ to C$_{12}$) substituted linear or branched arylalkanes, C$_1$ to C$_{30}$ (preferably C$_4$ to C$_{12}$) substituted or unsubstituted aryls, and c) mixtures thereof.

Applicant has found that the cross-linked polyethers of the present invention can be used to prepare resins which are amphiphilic and have high loadings. Moreover, these cross-linked polyethers are compatible with several reaction mediums easy to prepare. Moreover, these polyethers are chemically stable and non-sticky.

According to a third aspect of the invention, there is provided a method for the preparation of a cross-linked polyether, said method comprising the step of polymerizing of at least one monomer selected from the group consisting of
a) (α-X-methyl)vinyl-EWG, (α-X-methyl)vinyl-ERG, or (α-X-methyl) vinyl-aryl, where X is oxygen, sulfur, PEG, PPG or poly(THF);

b) a monomer which is polymerizable (preferably monomers such as styrenes, divinylbenzenes, acrylates, methacrylates, acrylamides, methacrylamides, styrenes, acroleins, vinyl ketones, maleimides, etc.) with a PEG, PPG or poly(THF) cross-linker having at least one (α-X-methyl)vinyl-EWG, (α-X-methyl)vinyl-ERG or (α-X-methyl)vinyl-aryl, where X is oxygen, sulfur, PEG, PPG, or poly(THF);

c) a PEG, PPG, or poly(THF) cross-linker having at least an acrylamide or a methacrylamide end group; and d) mixtures thereof.

In (c), the acrylamide or a methacrylamide can eventually be reduced, once polymerized, to a polyamine. Alternatively, at least two and preferably at least three of these monomers can be copolymerized.

According to a fourth aspect of the invention, there is provided a method for the preparation of a cross-linked polyether, said method comprising the step of polymerizing of at least one monomer selected from the group consisting of a) an α,α'-X-Y-epoxide, or an α,α'-X-Y-oxetane, where X is oxygen, sulfur, PEG, PPG, or poly(THF) and Y is selected from the group consisting of $C_3$ to $C_{50}$ (preferably $C_3$ to $C_{12}$) unsubstituted linear or branched alkanes, $C_1$ to $C_{50}$ (preferably $C_1$ to $C_{12}$) substituted linear or branched alkanes, $C_3$ to $C_{50}$ (preferably $C_3$ to $C_{12}$) unsubstituted linear or branched arylalkanes, $C_2$ to $C_{50}$ (preferably $C_2$ to $C_{12}$) substituted linear or branched arylalkanes, $C_1$ to $C_{30}$ (preferably $C_4$ to $C_{12}$) substituted or unsubstituted aryls, and b) a monomer which is polymerizable (preferably monomers such as styrenes, divinylbenzenes, acrylates, methacrylates, acrylamides, methacrylamides, styrenes, acroleins, vinyl ketones, maleimides, etc.) with a PEG, PPG or poly(THF) cross-linker having at least one α,α'-X-Y-epoxide or α,α'-X-Y-oxetane, where X is oxygen, sulfur, PEG, PPG or poly(THF), and Y is selected from the group consisting of $C_3$ to $C_{50}$ (preferably $C_3$ to $C_{12}$) unsubstituted linear or branched alkanes, $C_1$ to $C_{50}$ (preferably $C_1$ to $C_{12}$) substituted linear or branched alkanes, $C_3$ to $C_{50}$ (preferably $C_3$ to $C_{12}$) unsubstituted linear or branched arylalkanes, $C_2$ to $C_{50}$ (preferably $C_2$ to $C_{12}$) substituted linear or branched arylalkanes, $C_1$ to $C_{30}$ preferably $C_4$ to $C_{12}$) substituted or unsubstituted aryls, and c) mixtures thereof;

Applicants have found that the methods of the invention are simple and permit to prepare cross-linked polyethers which allow high loadings, and which have an interesting mechanical stability. These cross-linked polyethers also have very interesting swelling properties.

According to a fifth aspect of the invention, there is provided a compound of formula

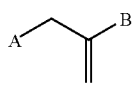

wherein

A is PEG, PPG, poly(THF), hydroxyl, $C_1$-$C_{30}$ (preferably $C_1$ to $C_{12}$) alkyloxy, $C_1$-$C_{30}$ (preferably $C_1$ to $C_{12}$) hydroxyalkyl, amino, $C_1$-$C_{30}$ (preferably $C_1$ to $C_{12}$) alkylamine, $C_1$-$C_{30}$ (preferably $C_1$ to $C_{12}$) aminoalkyl, formyl, $C_1$-$C_{30}$ (preferably $C_1$ to $C_{12}$) alkylaldehyde, thiol, $C_1$-$C_{30}$ (preferably $C_1$ to $C_{12}$) alkylthiol, halogen or $C_1$-$C_{30}$ (preferably $C_1$ to $C_{12}$) halogenoalkyl; and B represents an electron withdrawing group, an electron releasing group or a $C_1$-$C_{30}$ (preferably $C_4$ to $C_{12}$) aryl.

According to a sixth aspect of the invention, there is provided a compound of formula

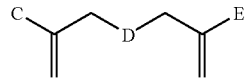

wherein

D is PEG, PPG or poly(THF); and

C and E represent independently an electron withdrawing group, an electron releasing group or a $C_1$-$C_{30}$ (preferably $C_4$ to $C_{12}$) aryl.

According to a seventh aspect of the invention, there is provided a compound of formula

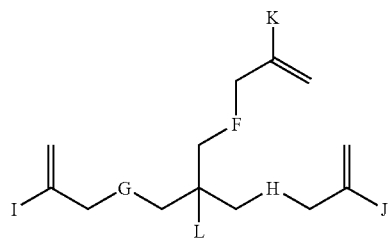

wherein

F, G and H represent independently PEG, PPG or poly(THF);

I, J and K represent independently an electron withdrawing group, an electron releasing group or a $C_1$-$C_{30}$ (preferably $C_4$ to $C_{12}$) aryl; and L represents H, $C_1$-$C_{30}$ (preferably $C_1$ to $C_{12}$) alkyl, $C_1$-$C_{30}$ (preferably $C_4$ to $C_{12}$) aryl, $C_3$-$C_{30}$ (preferably $C_3$ to $C_{12}$) aralkyl, glycidyl, $C_1$-$C_{30}$ (preferably $C_4$ to $C_{12}$) alkylglycidyl, hydroxyl or an alcohol protecting group.

According to an eighth aspect of the invention, there is provided a compound of formula

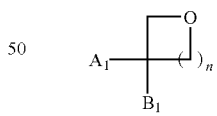

wherein n=0 or 1

$A_1$ represents PEG, PPG, poly(THF); and $B_1$ is selected from the group consisting of electron withdrawing groups, $C_3$ to $C_{50}$ (preferably $C_3$ to $C_{12}$) unsubstituted linear or branched alkanes, $C_1$ to $C_{50}$ (preferably $C_3$ to $C_{12}$) substituted linear or branched alkanes, $C_3$ to $C_{50}$ (preferably $C_3$ to $C_{12}$) unsubstituted linear or branched arylalkanes, $C_2$ to $C_{50}$ (preferably $C_2$ to $C_{12}$) substituted linear or branched arylalkanes, and $C_1$ to $C_{30}$ (preferably $C_1$ to $C_{12}$) substituted or unsubstituted aryls.

According to a ninth aspect of the invention, there is provided a compound of formula

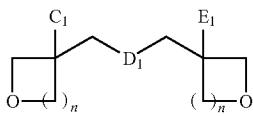

wherein m and o are independently 0 or 1;

$D_1$ represents PEG, PPG or poly(THF); and $C_1$ and $E_1$ are independently selected from the group consisting of electron withdrawing groups, $C_3$ to $C_{50}$ (preferably $C_3$ to $C_{12}$) unsubstituted linear or branched alkanes, $C_1$ to $C_{50}$ (preferably $C_1$ to $C_{12}$) substituted linear or branched alkanes, $C_3$ to $C_{50}$ (preferably $C_3$ to $C_{12}$) unsubstituted linear or branched arylalkanes, $C_2$ to $C_{50}$ (preferably $C_2$ to $C_{12}$) substituted linear or branched arylalkanes, and $C_1$ to $C_{30}$ (preferably $C_4$ to $C_{12}$) substituted or unsubstituted aryls.

According to a tenth aspect of the invention, there is provided a compound of formula

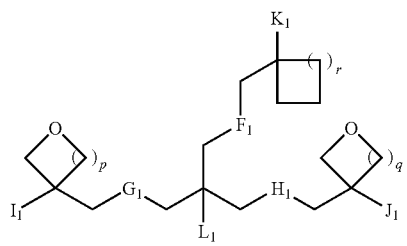

wherein p, q and r are independently 0 or 1;

$F_1$, $G_1$ and $H_1$ represent independently PEG, PPG or poly(THF);

$I_1$, $J_1$ and $K_1$ are independently selected from the group consisting of electron withdrawing groups, $C_3$ to $C_{50}$ (preferably $C_3$ to $C_{12}$) unsubstituted linear or branched alkanes, $C_1$ to $C_{50}$ (preferably $C_1$ to $C_{12}$) substituted linear or branched alkanes, $C_3$ to $C_{50}$ (preferably $C_3$ to $C_{12}$) unsubstituted linear or branched arylalkanes, $C_2$ to $C_{50}$ (preferably $C_3$ to $C_{12}$) substituted linear or branched arylalkanes, and $C_1$ to $C_{30}$ (preferably $C_4$ to $C_{12}$) substituted or unsubstituted aryls; and $L_1$ represents H, $C_1$-$C_{30}$ (preferably $C_1$ to $C_{12}$) alkyl, $C_1$-$C_{30}$ (preferably $C_4$ to $C_{12}$) aryl, $C_3$-$C_{30}$ (preferably $C_3$ to $C_{12}$) aralkyl, glycidyl, $C_1$-$C_{30}$ (preferably $C_3$ to $C_{12}$) alkylglycidyl, hydroxyl or an alcohol protecting group.

According to an eleventh aspect of the invention, there is provided monomers and cross-linkers which are as defined in the previous aspect of the invention.

According to a twelfth aspect of the invention, there is provided the use of PEG, PPG or poly(THF) based polymer for preparing a cross-linked polyether or for preparing a polymeric support for use in bioorganic or organic chemistry.

The compounds according to any aspect the present invention can be used for preparing the polyether polymers previously defined. Alternatively, they can be used for preparing a cross-linked polyether resin or for preparing a polymeric support for use in bioorganic or organic chemistry. These compounds can also be used in the methods of the present invention. The compounds of the sixth, seventh, eighth, ninth or tenth aspect of the invention can be used as cross-linkers.

The expression "electron withdrawing group" (EWG) has used herein refers to a group bearing an electron deficient group and/or having an electronegativity less than the hydrogen atom. Preferably, the electron withdrawing group is halogen, formyl, cyano, ester, amide, ketone, nitro, sulfoxide, sulfonate, nitrile, aldehyde, or ketone.

The expression "electron releasing group" (ERG) has used herein refers to a group bearing an electron rich group and/or having an electronegativity more than the hydrogen atom. Preferably, the electron releasing group is selected from the group consisting of $C_1$ to $C_{30}$ linear or branched alkyls, $C_2$ to $C_{30}$ linear or branched aralkyls or $C_1$ to $C_{30}$ aryls, oxygen, sulphur, ethers, and amines (preferably secondary amines) etc.

The expression "substituted linear or branched alkanes" has used herein refers to alkanes which are substituted. These alkanes can be substituted by alkyls, halogens, amines, amides, alcohols, ethers, esters, aldehydes, carboxylic acids, nitro, cyano, sulphonates, phosphates derivatives etc.

The expression "substituted linear or branched arylalkanes" has used herein refers to arylalkanes which are substituted. These arylalkanes can be substituted by alkyls, halogens, amines, amides, alcohols, ethers, esters, aldehydes, carboxylic acids, nitro, cyano, sulphonates, phosphates derivatives etc.

The expression "substituted linear or branched alkyls" has used herein refers to alkyls which are substituted. These alkyls can be substituted by alkyls, halogens, amines, amides, alcohols, ethers, esters, aldehydes, carboxylic acids, nitro, cyano, sulphonates, phosphates derivatives etc.

The expression "substituted linear or branched arylalkyls" has used herein refers to arylalkyls which are substituted. These arylalkyls can be substituted by alkyls, halogens, amines, amides, alcohols, ethers, esters, aldehydes, carboxylic acids, nitro, cyano, sulphonates, phosphates derivatives etc.

The expression "substituted or unsubstituted aryls" has used herein refers to aryls which are optionally substituted. These aryls can be substituted by alkyls, halogens, amines, amides, alcohols, ethers, esters, aldehydes, carboxylic acids, nitro, cyano, sulphonates, phosphates derivatives etc.

The term "aryls" has used herein can refer to aryls such as phenyls, naphtyls, anthracenyls, etc., or to heteroaryls such as uryl, thienyl, pyridyl, anisolyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl etc.

In the cross-linked polyether according to the first aspect of the invention, the monomer can be copolymerized with styrene, which can be in an amount of about 0.01 to about 99.99%, and preferably about 10 to about 90%. Alternatively, the monomer can be copolymerized with cross-linker. The cross-linker can be divinylbenzene, which can be in an amount of about 0.01 to about 99.99%, and preferably about 0.2 to about 50%

In another preferred embodiment, the monomer, in the polyether of the first aspect, can be a polymerizable compound having the general formula

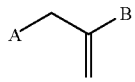

wherein

A represents H, $C_1$-$C_{30}$ allyl, $C_1$-$C_{30}$ aryl, $C_3$-$C_{30}$ aralkyl, PEG, PPG, poly (THF), hydroxyl, $C_1$-$C_{30}$ alkyloxy, $C_1$-$C_{30}$ hydroxyalkyl, amino, $C_1$-$C_{30}$, alkylamine, $C_1$-$C_{30}$ aminoalkyl, formyl, $C_1$-$C_{30}$ alkylaldehyde, thiol, $C_1$-$C_{30}$ alkylthiol, halogen or an $C_1$-$C_{30}$ halogenoalkyl; and B represents an electron withdrawing group, an electron releasing group or a $C_1$-$C_{30}$ aryl.

In another preferred embodiment, the monomer of the first or second aspect can be copolymerized with a PEG, PPG, or a poly(THF) based cross-linker.

In another preferred embodiment, the monomer of the first aspect can be copolymerized with a secondary cross-linker of the general formula

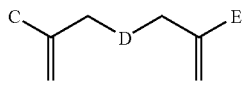

wherein

D represents a $C_1$-$C_{30}$ alkyl, $C_1$-$C_{30}$ aryl, $C_3$-$C_{30}$ aralkyl, oxygen, sulphur, PEG, PPG or poly(THF);

C and E represent independently an electron withdrawing group, an electron releasing group or a $C_1$-$C_{30}$ aryl.

In another preferred embodiment, the monomer of the first aspect can be copolymerized with a secondary cross-linker selected from the group consisting of a PEG, PPG, poly(THF) or a secondary cross-linker having at least an acrylamide or an methacrylamide) end group.

In another preferred embodiment, the monomer of the first aspect can be copolymerized with a tertiary cross-linker of the general formula

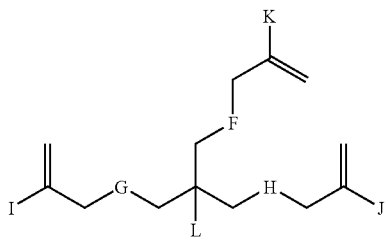

wherein

F, G and H represent independently a $C_1$-$C_{30}$ alkyl, $C_1$-$C_{30}$ aryl, $C_3$-$C_{30}$ aralkyl, oxygen, sulphur, PEG, PPG or poly (THF);

I, J and K represent independently an electron withdrawing group, an electron releasing group or a $C_1$-$C_{30}$ aryl.

L represents H, $C_1$-$C_{30}$ alkyl, $C_1$-$C_{30}$ aryl, $C_3$-$C_{30}$ aralkyl, glycidyl, $C_1$-$C_{30}$ alkylglycidyl, hydroxyl or an alcohol protecting group.

In another preferred embodiment, the monomer of the first aspect, can be copolymerized with a comb-like or a star-shaped cross-linker derivatized with a (α-X-methyl)vinyl-EWG, (α-X-methyl)vinyl-ERG or (α-X-methyl)vinyl-aryl, where X is oxygen, sulfur, PEG, PPG, or poly(THF); derivatives selected from the group consisting of acrylates, acrylamides, acrylonitriles, acroleins, vinyl ketones, vinyl chlorides, vinyl bromides, and styrenes; or a PEG, PPG, or poly (THF) having at least an acrylamide or a methacrylamide end group.

In another preferred embodiment, the monomer in the cross-linked polyether of the first aspect, can be produced by the Baylis-Hillman reaction or by an acid catalysis from an alcohol and a vinyl derivative, in a dehydration process. Preferably, the vinyl derivative is vinyl-EWG, vinyl-ERG or vinyl-aryl.

In another preferred embodiment, the monomer, in the polyether of the second aspect, can be a polymerizable compound having the general formula

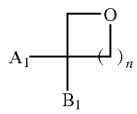

wherein n=0 or 1

$A_1$ H, $C_1$-$C_{30}$ alkyl, $C_1$-$C_{30}$ aryl, $C_3$-$C_{30}$ aralkyl, PEG, PPG, poly(THF), hydroxyl, $C_1$-$C_{30}$ alkyloxy, $C_1$-$C_{30}$ hydroxyalkyl, amino, $C_1$-$C_{30}$, alkylamine, $C_1$-$C_{30}$ aminoalkyl, formyl, $C_1$-$C_{30}$ alkylaldehyde, thiol, $C_1$-$C_{30}$ alkylthiol, halogen or an $C_1$-$C_{30}$ halogenoalkyl; and $B_1$ is selected from the group consisting of electron withdrawing groups, $C_3$ to $C_{50}$ unsubstituted linear or branched alkanes, $C_1$ to $C_{50}$ substituted linear or branched alkanes, $C_3$ to $C_{50}$ unsubstituted linear or branched arylalkanes, $C_2$ to $C_{50}$ substituted linear or branched arylalkanes, and $C_1$ to $C_{30}$ substituted or unsubstituted aryls.

In another preferred embodiment, the monomer of the second aspect can be copolymerized with a secondary cross-linker of the general formula

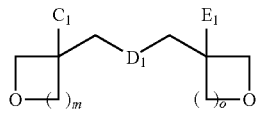

wherein m and o are independently 0 or 1;

$D_1$ represents a $C_1$-$C_{30}$ alkyl, $C_1$-$C_{30}$ aryl, $C_3$-$C_{30}$ aralkyl, oxygen, sulphur, PEG, PPG or poly(THF); and $C_1$ and $E_1$ are independently selected from the group consisting of electron withdrawing groups, $C_3$ to $C_{50}$ unsubstituted linear or branched alkanes, $C_1$ to $C_{50}$ substituted linear or branched alkanes, $C_3$ to $C_{50}$ unsubstituted linear or branched arylalkanes, $C_2$ to $C_{50}$ substituted linear or branched arylalkanes, and $C_1$ to $C_{30}$ substituted or unsubstituted aryls.

In another preferred embodiment, the monomer of the second aspect can be copolymerized with a tertiary cross-linker of the general formula

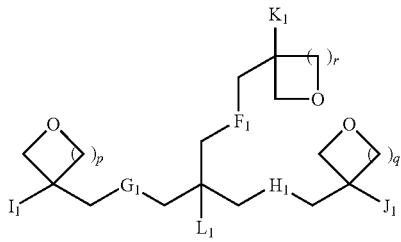

wherein p, q and r are independently 0 or 1;

$F_1$, $G_1$ and $H_1$ represent independently a $C_1$-$C_{30}$ alkyl, $C_1$-$C_{30}$ aryl, $C_3$-$C_{30}$ aralkyl, oxygen, sulphur, PEG, PPG or poly(THF);

$I_1$, $J_1$ and $K_1$ are independently selected from the group consisting of electron withdrawing groups, $C_3$ to $C_{50}$ unsubstituted linear or branched alkanes, $C_1$ to $C_{50}$ substituted linear or branched alkanes, $C_3$ to $C_{50}$ unsubstituted linear or branched arylalkanes, $C_2$ to $C_{50}$ substituted linear or branched arylalkanes, and $C_1$ to $C_{30}$ substituted or unsubstituted aryls; and $L_1$ represents H, $C_1$-$C_{30}$ alkyl, $C_2$-$C_{30}$ aryl, $C_3$-$C_{30}$ aralkyl, glycidyl, $C_1$-$C_{30}$ alkylglycidyl, hydroxyl or an alcohol protecting group.

In another preferred embodiment, the monomer of the second aspect can be copolymerized with a comb-like or a star-shaped cross-linker derivatized with an α,α'-X-Y-epoxide or an α,α'-X-Y-oxetane, where X is selected from the group consisting of oxygen, sulfur, PEG, PPG and poly(THF)); and Y is selected from the group consisting of $C_3$ to $C_{50}$ unsubstituted linear or branched alkanes, $C_1$ to $C_{50}$ substituted linear or branched alkanes, $C_3$ to $C_{50}$ unsubstituted linear or branched arylalkanes, $C_2$ to $C_{50}$ substituted linear or branched arylalkanes, and $C_1$ to $C_{30}$ substituted or unsubstituted aryls.

In the polyether of the first and second aspects, and the compounds of any aspect of the invention, the functional groups A, $A_1$, B, $B_1$, C, $C_1$, E, $E_1$, I, $I_1$, J, $J_1$, K, $K_1$, and L, $L_1$ can be chemically modified to provide linkers for organic, peptide, protein, nucleotide and saccharide synthesis, for the immobilisation of proteins and reagents, for chromatographic and scavenging purposes, as reverse phase packing and chromatographic devices, in ion exchange and normal phase chromatography. Preferably the linkers are selected from alcohol, $C_1$-$C_{30}$ alkylalcohols, halogens, $C_1$-$C_{30}$ halogenoalkyls, $C_1$-$C_{30}$ hydroxyalkyls, amines, $C_1$-$C_{30}$ alkylamines, $C_1$-$C_{30}$ alkylaminoalkyls, $C_1$-$C_{30}$ aryls, $C_1$-$C_{30}$ alkyls, $C_3$-$C_{30}$ aralkyls, nitrile, $C_1$-$C_{30}$ alkylnitriles, carboxylic acids, $C_1$-$C_{30}$ carboxyalkyls, esters, $C_1$-$C_{30}$ alkylesters, thiols, $C_1$-$C_{30}$ alkylthiols, sulfos, $C_1$-$C_{30}$ alkylsulfos, sulfinos, $C_1$-$C_{30}$ alkylsulinos, sulfenos, $C_1$-$C_{30}$ alkylsulfenos, and derivatives thereof. Comb-like (Ito et al., (1992), Macromol. Vol. 25, 1534-1538) and star-shaped CL are also covered by the present invention. Theses CL are functionalized with PEG, PPG and/or poly(THF) with the aforementioned α-methyl)vinyl-EWG and/or α,α'-X-Y-(epoxide and/or oxetane) and/or derivatives and/or having at least one acrylamide (and/or methacrylamide) end group (that will later be reduced once polymerized to a polyamine) at the end of each "tentacles".

The method according to the third aspect of the invention can comprise a) copolymerizing a polymerizable monomer having the general formula

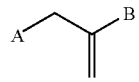

wherein

A represents H, $C_1$-$C_{30}$ alkyl, $C_1$-$C_{30}$ aryl, $C_3$-$C_{30}$ aralkyl, PEG, PPG, poly (THF), hydroxyl, $C_1$-$C_{30}$ alkyloxy, $C_1$-$C_{30}$ hydroxyalkyl, amino, $C_1$-$C_{30}$, alkylamine, $C_1$-$C_{30}$ aminoalkyl, formyl, $C_1$-$C_{30}$ alkylaldehyde, thiol, $C_1$-$C_{30}$ alkylthiol, halogen or an $C_1$-$C_{30}$ halogenoalkyl; and B represents an electron withdrawing group, an electron releasing group or an aryl together with i) a secondary cross-linker of the general formula

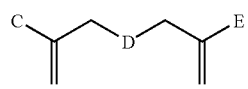

wherein

D represents a $C_1$-$C_{30}$ alkyl, $C_1$-$C_{30}$ aryl, $C_3$-$C_{30}$ aralkyl, oxygen, sulphur, PEG, PPG or poly(THF);

C and E represent independently an electron withdrawing group, an electron releasing group or a $C_1$-$C_{30}$ aryl;

ii) a PEG, PPG, or poly(THF) cross-linker having at least an acrylamide or a methacrylamide end group;

iii) a tertiary cross-linker of the general formula

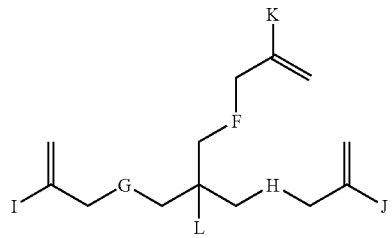

wherein

F, G and H represent independently a $C_1$-$C_{30}$ alkyl, $C_1$-$C_{30}$ aryl, $C_3$-$C_{10}$ aralkyl, oxygen, sulphur, PEG, PPG or poly (THF);

I, J and K represent independently an electron withdrawing group, an electron releasing group or a $C_1$-$C_{30}$ aryl;

L represents H, $C_1$-$C_{30}$ alkyl, $C_1$-$C_{30}$ aryl, $C_3$-$C_{30}$ aralkyl, glycidyl, $C_1$-$C_{30}$ alkylglycidyl, hydroxyl or an alcohol protecting group;

iv) a comb-like or a star-shaped cross-linker derivatized with a (α-X-methyl)vinyl-EWG, (α-X-methyl)vinyl-ERG or (α-X-methyl)vinyl-aryl, where X is oxygen, sulfur, PEG, PPG, or poly(THE); derivatives selected from the group consisting of acrylates, acrylamides, acrylonitriles, acroleins, vinyl ketones, vinyl chlorides, vinyl bromides, and styrenes; or a PEG, PPG, or poly(THF) having at least an acrylamide or a methacrylamide end group; or v) divinylbenzene, so as to obtain said polyether; and b) chemically modifying said polyether so as to obtain a polyether derivative selected from the group consisting of aldehyde, amine, ketone, halogen, carboxylic acid, thiol, amide and or ester resin.

Preferably, the cross-linked polyether is obtained by suspension radical polymerization. Alternatively, the method comprises carrying said copolymerization in the presence of additional polymerizable monomers selected from the group consisting of styrene, acrylates, acrylamides, acrylonitriles, acroleins (and their methacrylic derivatives), vinyl ketones, vinyl chlorides or vinyl bromides. The method can also comprise functionalizing said monomer with groups capable of anchoring linkers. Alternatively, the method can comprise functionalizing said acrylamide or methacrylamide monomer with groups capable of anchoring linkers.

In accordance with a preferred embodiment, the method of the third aspect comprises (a) copolymerizing the above vinylic polymerizable compound with a compound selected from the above vinylic secondary, tertiary, comb-like, star-shaped and/or divinylbenzene CL to give the above polymer, (b) reacting the polymer to give a polyester (by transesterification or not), polyol, polyaldehyde, polycarboxylic acid, polythiol and/or polyamine (from acrylamide and/or methacrylamide or not) resin that will be later derivatized.

The method according to the fourth aspect of the invention can comprise a) copolymerizing a polymerizable monomer having the general formula

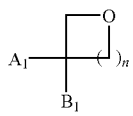

wherein n=0 or 1

$A_1$ H, $C_1$-$C_{30}$ alkyl, $C_1$-$C_{30}$ aryl, $C_3$-$C_{30}$ aralkyl, PEG, PPG, poly(THF), hydroxyl, $C_1$-$C_{30}$ alkyloxy, $C_1$-$C_{30}$ hydroxyalkyl, amino, $C_1$-$C_{30}$, alkylamine, $C_1$-$C_{30}$ aminoalkyl, formyl, $C_1$-$C_{30}$ alkylaldehyde, thiol, $C_1$-$C_{30}$ alkylthiol, halogen or an $C_1$-$C_{30}$ halogenoalkyl; and $B_1$ is selected from the group consisting of electron withdrawing groups, $C_3$ to $C_{50}$ unsubstituted linear or branched alkanes, $C_1$ to $C_{50}$ substituted linear or branched alkanes, $C_3$ to $C_{50}$ unsubstituted linear or branched arylalkanes, $C_2$ to $C_{50}$ substituted linear or branched arylalkanes, and $C_1$ to $C_{30}$ substituted or unsubstituted aryls, together with i) a secondary cross-linker of the general formula

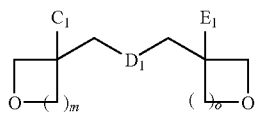

wherein m and o are independently 0 or 1;

$D_1$ represents a $C_1$-$C_{30}$ alkyl, $C_1$-$C_{30}$ aryl, $C_3$-$C_{30}$ aralkyl, oxygen, sulphur, PEG, PPG or poly(THF); and $C_1$ and $E_1$ are independently selected from the group consisting of electron withdrawing groups, $C_3$ to $C_{50}$ unsubstituted linear or branched alkanes, $C_1$ to $C_{50}$ substituted linear or branched alkanes, $C_3$ to $C_{50}$ unsubstituted linear or branched arylalkanes, $C_2$ to $C_{50}$ substituted linear or branched arylalkanes, and $C_1$ to $C_{30}$ substituted or unsubstituted aryls;

ii) a tertiary cross-linker of the general formula

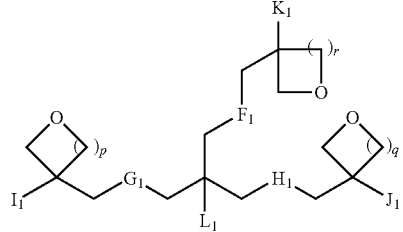

wherein p, q and r are independently 0 or 1;

$F_1$, $G_1$ and $H_1$ represent independently a $C_1$-$C_{30}$ allyl, $C_2$-$C_{30}$ aryl, $C_3$-$C_{30}$ aralkyl, oxygen, sulphur, PEG, PPG or poly(THF);

$I_1$, $J_1$ and $K_1$ are independently selected from the group consisting of electron withdrawing groups, $C_3$ to $C_{50}$ unsubstituted linear or branched alkanes, $C_1$ to $C_{50}$ substituted linear or branched alkanes, $C_3$ to $C_{50}$ unsubstituted linear or branched arylalkanes, $C_2$ to $C_{50}$ substituted linear or branched arylalkanes, and $C_1$ to $C_{30}$ substituted or unsubstituted aryls; and $L_1$ represents H, $C_1$-$C_{30}$ alkyl, $C_2$-$C_{30}$ aryl, $C_3$-$C_{30}$ aralkyl, glycidyl, $C_1$-$C_{30}$ alkylglycidyl, hydroxyl or an $C_1$-$C_{30}$ alkylol protecting group; or iii) a comb-like or a star-shaped cross-linker derivatized with an $\alpha,\alpha'$-X-Y-epoxide or an $\alpha,\alpha'$-X-Y-oxetane, where X is selected from the group consisting of oxygen, sulfur, PEG, PPG and poly(THF)), and Y is selected from the group consisting of $C_3$ to $C_{50}$ unsubstituted linear or branched alkanes, $C_1$ to $C_{50}$ substituted linear or branched alkanes, $C_3$ to $C_{50}$ unsubstituted linear or branched arylalkanes, $C_2$ to $C_{50}$ substituted linear or branched arylalkanes, and $C_1$ to $C_{30}$ substituted or unsubstituted aryls; and b) chemically modifying said polyether so as to obtain a polyether derivative selected from the group consisting of aldehyde, amine, ketone, halogen, carboxylic acid, thiol, amide and or ester resin.

Preferably, the cross-linked polyether is obtained by suspension cationic polymerization. Alternatively, the method can comprise carrying said copolymerization in the presence of additional polymerizable monomers selected from the group consisting of epoxides, oxetanes, vinyl and allyl ethers. Also, the method can comprise functionalizing said $\alpha,\alpha'$-X-Y-epoxide or $\alpha,\alpha'$-X-Y-oxetane monomer with groups capable of anchoring linkers.

In accordance with a preferred embodiment, the method defined in the fourth aspect comprises (a) copolymerizing the above epoxide and/or oxetane polymerizable compound with a compound selected from the above epoxide and/or oxetane secondary, tertiary, comb-like, star-shaped CL to give the above polymer, (b) reacting the polymer to give a polyester (by transesterification or not), polyol, polyaldehyde, polycarboxylic acid, polythiol and/or polyamine (from acrylamide and/or methacrylamide or not) resin that will be later derivatized.

Preferably, the methods of the third and the fourth aspects comprise synthesizing the cross-linked polyether into beaded form. The beads can be formed by normal or inverse suspension. Preferably, the groups capable of anchoring linkers are selected from aldehydes, alcohols, halogens, ketones, amino, and phenyl groups which can be derivatized into said anchoring linkers.

According to the present invention, any of the new monomers and CL ester bond can be reacted to functionality useful for anchoring linkers used in SPPS and SPOS. The end groups of the monomers and/or CL may also contain alcohol, halogen, aldehyde, amino, carboxylic acid, thiol and/or phenyl groups that can be lately derivatized in (or with) useful linkers for peptide synthesis or bioorganic and organic chemistry.

The resins, polymers and compounds of the invention can be used in solid and liquid phase synthesis, chromatography, for scavenging purposes and immobilisation of proteins and reagents.

Monomers and/or CL can be functionalized before or after the polymerization with different linkers useful for peptide, bioorganic and organic chemistry, and the like.

Examples of derivatization of the final polymer:

| Chemical function | Reducing | Nucleophilic | Hydrolytic |
|---|---|---|---|
| Ester | Alcohol or aldehyde | Alcohol, ester and amide | Carboxylic acid |
| Amide | Amine | Alcohol | Carboxylic acid |
| Nitrile | Amine | Alcohol | Carboxylic acid |
| Aldehyde | Alcohol | Alcohol | — |
| Ketone | Alcohol | Alcohol | — |
| Nitro | Amine | — | — |
| Sulfoxide | Thiol | — | — |
| Sulfonate | Thiol | — | — |

The cross-linked polymer according to the invention is designed in such a way that it is possible to modify its properties by an appropriate choice of monomers (including single monomer, secondary, tertiary, comb-like and/or star-shaped CL). Indeed, the length of each monomer and/or CL will affect the swelling of the final resin. That way, it is possible to obtain a resin with several mechanical and swelling behaviours. That feature is greatly helpful for the design of resins for continuous flow to batchwise synthesis. By using a longer monomer and/or CL, the polymer is a more porous polymer enabling high molecular weight molecule penetration, which is effective for peptide, oligonucleotide, oligosaccharide synthesis and protein immobilisation. Shorter monomers give a resin adapted for small molecule synthesis as found in current organic chemistry.

Furthermore, that physical aspect can be used for permeation chromatography where a porous matrix is essential. A harder resin will be useful for low to high pressure chromatography where a very small to no change in volume of the matrix is needed.

The chemical nature of the PEG, PPG and/or poly(THF) gives to the polymer an exceptional versatility in most of organic and aqueous solvents. In organic synthesis and chromatography, low to high polarity solvents are often used in the same experiment. The amphiphilic nature of the glycol derivatives according to the invention gives extraordinary swelling in solvents such as water, N,N-dimethylformamide, methanol, methylene chloride, tetrahydrofuran, acetone, toluene and chemical families associated therewith.

The cross-linked polymer according to the first aspect can be obtained by suspension radical copolymerization of a mixture (or not) of the aforementioned acrylic, acrylonitriles, acrylamides, acroleins, vinyl ketones, vinyl chloride and/or bromide derivative monomers (and/or styrene) with the aforementioned secondary, tertiary, comb-like and/or star-shaped CL and/or divinylbenzene.

The cross-linked polymer according to the second aspect can be obtained by suspension cationic copolymerization of a mixture (or not) of the aforementioned epoxides and/or oxetanes monomers with the aforementioned secondary, tertiary, comb-like and/or star-shaped CL (for examples of such processes, see Renil et al. ((1996), Tetrahedron Lett., 37, 6185-6188) and Rademann et al., ((1999), J. Am. Chem. Soc., 121, 5459-5466.)

According to the invention, the functional groups L and $L_1$ can be modified chemically before or after the copolymerization, into several types of linkers such as alcohol, alkylalcohol, amino, alkylamino, aryl, alkyl, aralkyl, cyano, carboxyl, ester, mercapto, sulfo, sulfino, sulfeno in any derivatives thereof or in any protected form. Furthermore, any already designed linker for organic, peptide, nucleotide and saccharide synthesis can be attached to the monomer (as L and/or $L_1$) or by any functionality described above as a spacer.

Theses linkers can be used for organic, peptide, protein, nucleotide and saccharide synthesis. They can also be used also for the immobilisation of protein and reagents or for chromatographic and scavenging purposes. End-capped monomers (such as alkyl and aryl in place of L and/or $L_1$) can be used as chromatographic devices as reversed-phase packing. Other polar functionality for L and/or $L_1$ such as $SO_3H$ and $NH_2$ can be used in ion exchange and normal phase chromatography.

According to the present invention, it is possible to use other polymerizable monomers (such as styrene or divinylbenzene) leading to the polymer according to the present invention.

The polymer can be generated into a preferred beaded (spherical) form by processes such as normal and inverse suspension, emulsion, dispersion, seeded or precipitation polymerizations. Normal and/or inverse suspension polymerization is the preferred method for the production of beads according to the present invention.

Bulk and solution polymerization should normally be avoided because no beads are thus formed. Nevertheless, powders obtained directly or by grinding and sieving of the bulk polymer and/or any other solid form of polymer can be obtained by theses two processes and can be employed as solid support in the applications listed above.

Radical initiated polymerisation is the standard way by which vinyl monomers are polymerized although other methods can be used according to the present invention.

According to the present invention, the aforementioned "(α-methyl)vinyl-EWG" and/or acrylamide and/or methacrylamide monomers and/or CL may for example be copolymerized by radical polymerization with vinyl ether and allyl compounds that are known to copolymerize easily in the presence of other vinyl compounds such as acrylic, methacrylic acids and/or esters and/or derivatives.

The polymerization is normally initiated by products that upon heating, ultraviolet and/or gamma radiation give free radicals. In the present invention organic peroxides such as benzoyl and lauroyl peroxides are preferred. Heating the reaction mixture is the preferred way to form these free radicals.

In a same approach, vinyl and/or allyl ethers can be copolymerized with the aforementioned epoxides and/or oxetanes monomers and/or CL by cationic and/or anionic polymerization processes.
Particularly preferred resins of the present invention are cross-linked polyether resins which comprise a unit of formula
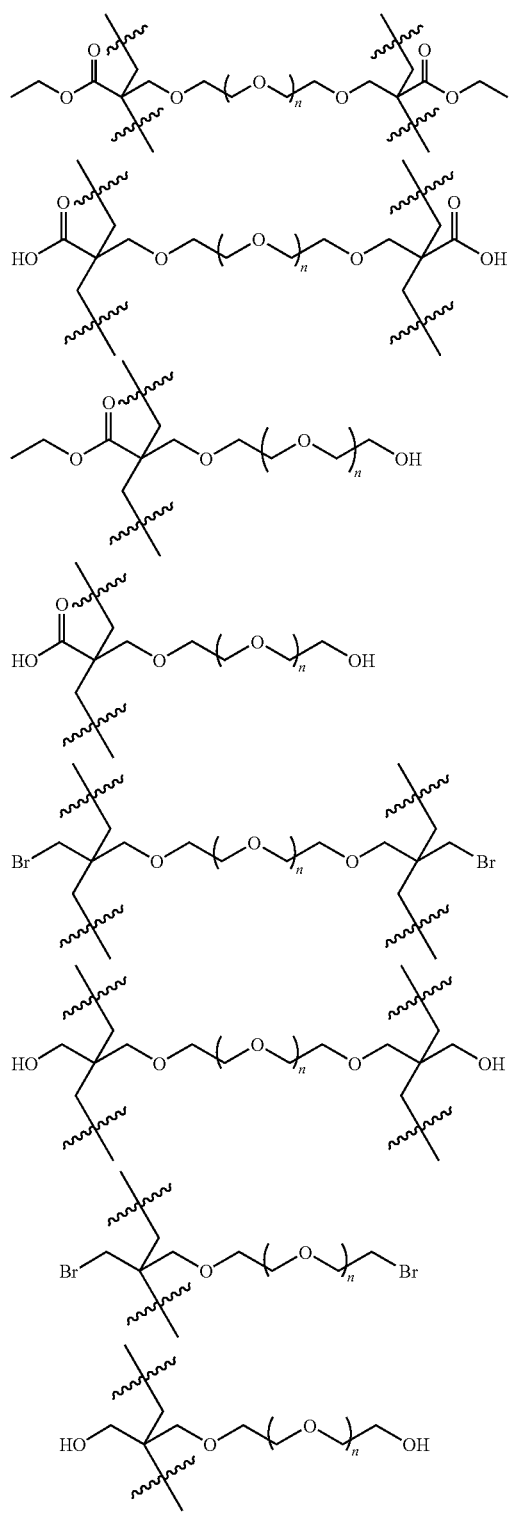
-continued
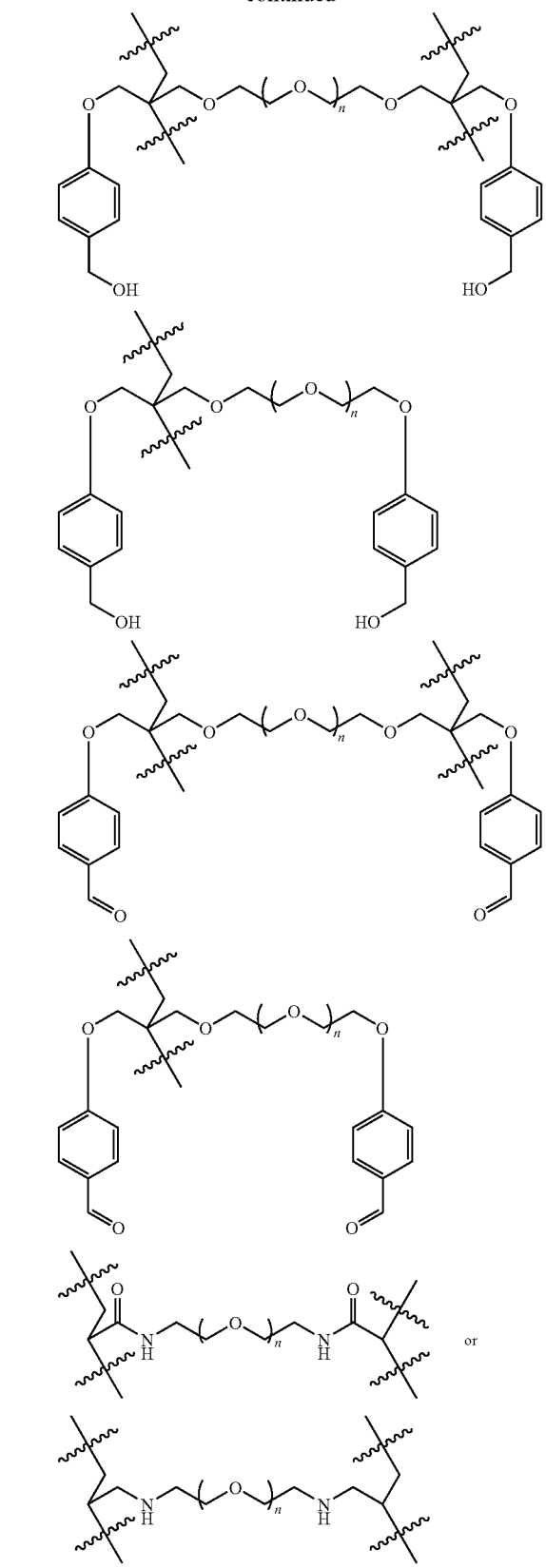
wherein n has a value of 1 to 100.

Other interesting compounds of the invention are of formula

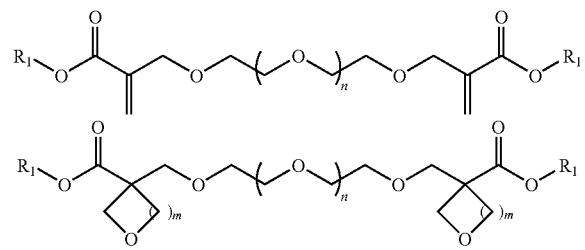

wherein $R_1$ is a $C_1$-$C_{10}$ alkyl which is linear or branched. $R_1$ can also be substituted as previously defined.

BRIEF DESCRIPTION OF DRAWINGS

Further features and advantages of the invention will become more readily apparent from the following description of preferred embodiments as illustrated by way of examples in the appended drawings wherein.

Figure 1:
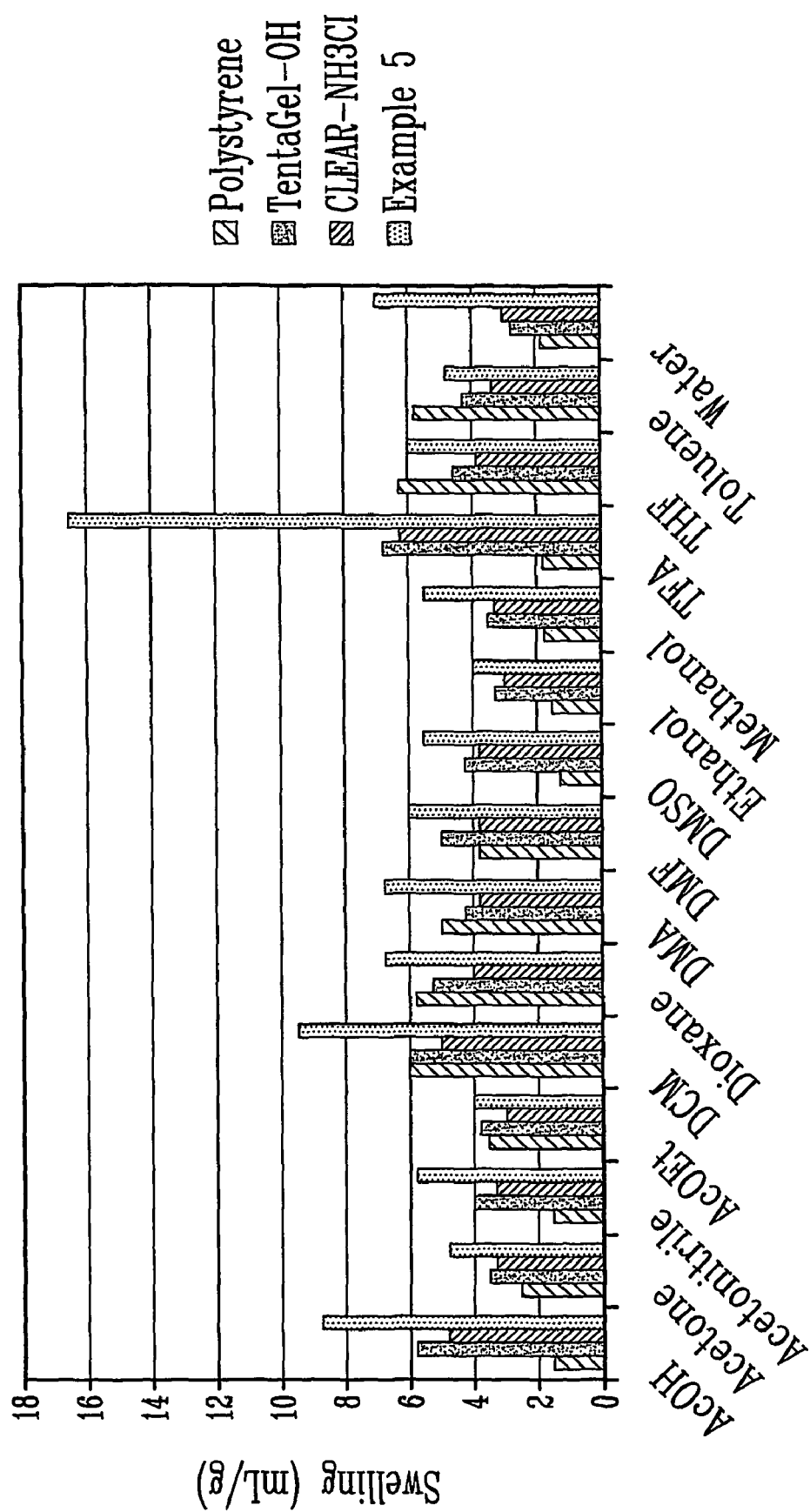
FIG. 1 is a diagram comparing the swelling of commercial resins and with the swelling of a resin according to a preferred embodiment of the invention.
Figure 2:
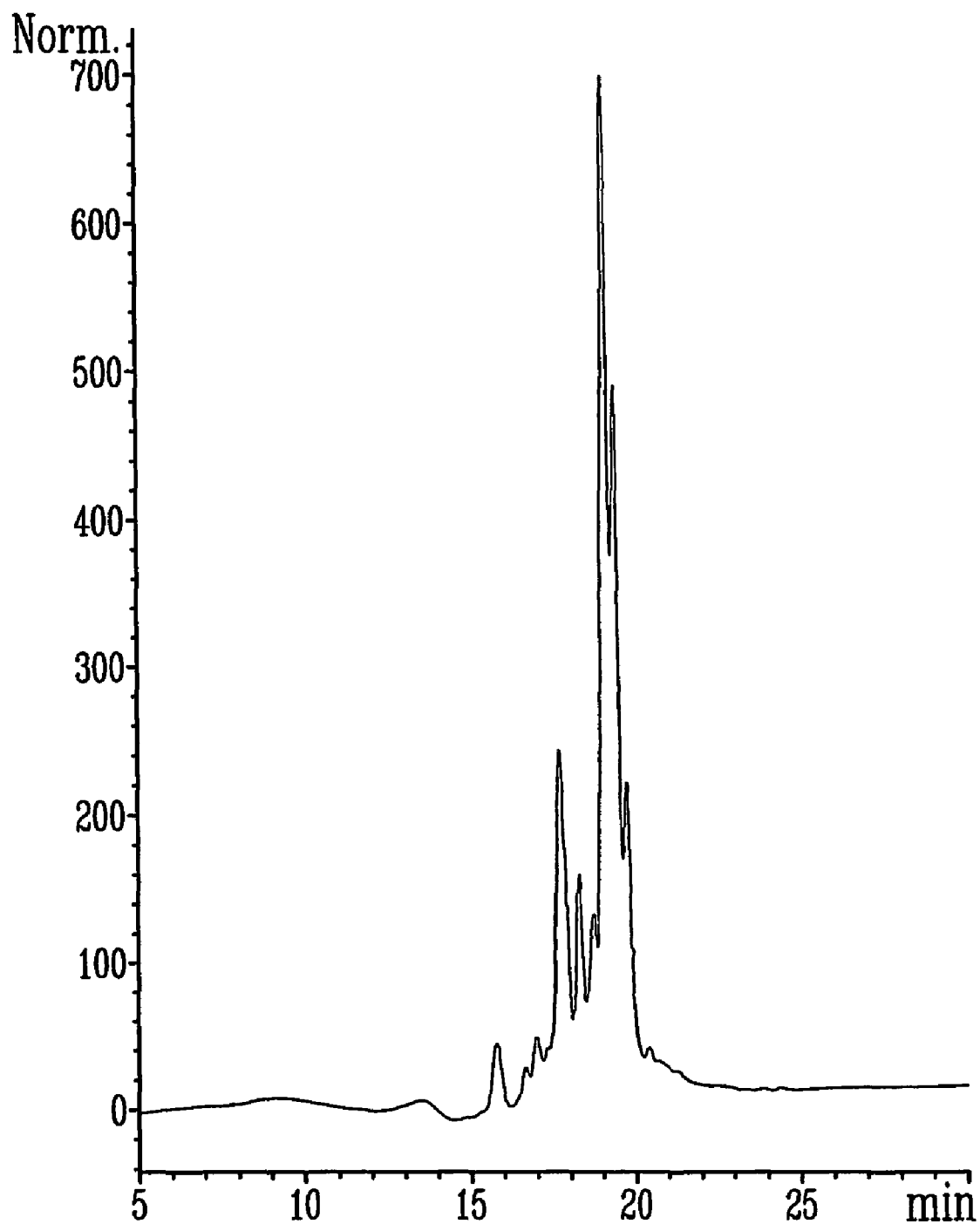
FIG. 2 is a chromatogram showing the purity obtained during a synthesis of a compound when using a commercial resin.
Figure 3:
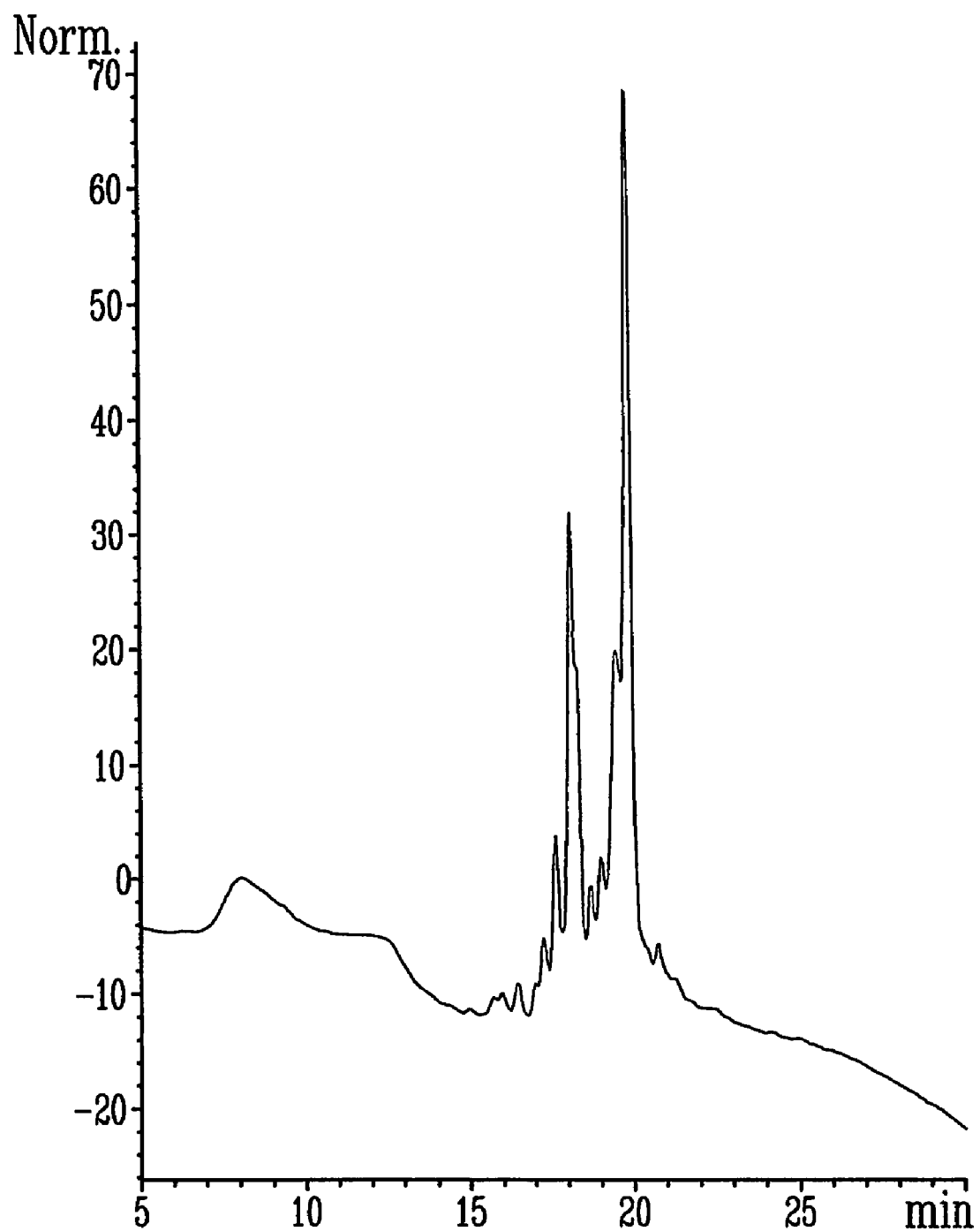
FIG. 3 is a chromatogram showing the purity obtained during a synthesis of a compound when using another commercial resin.
Figure 4:
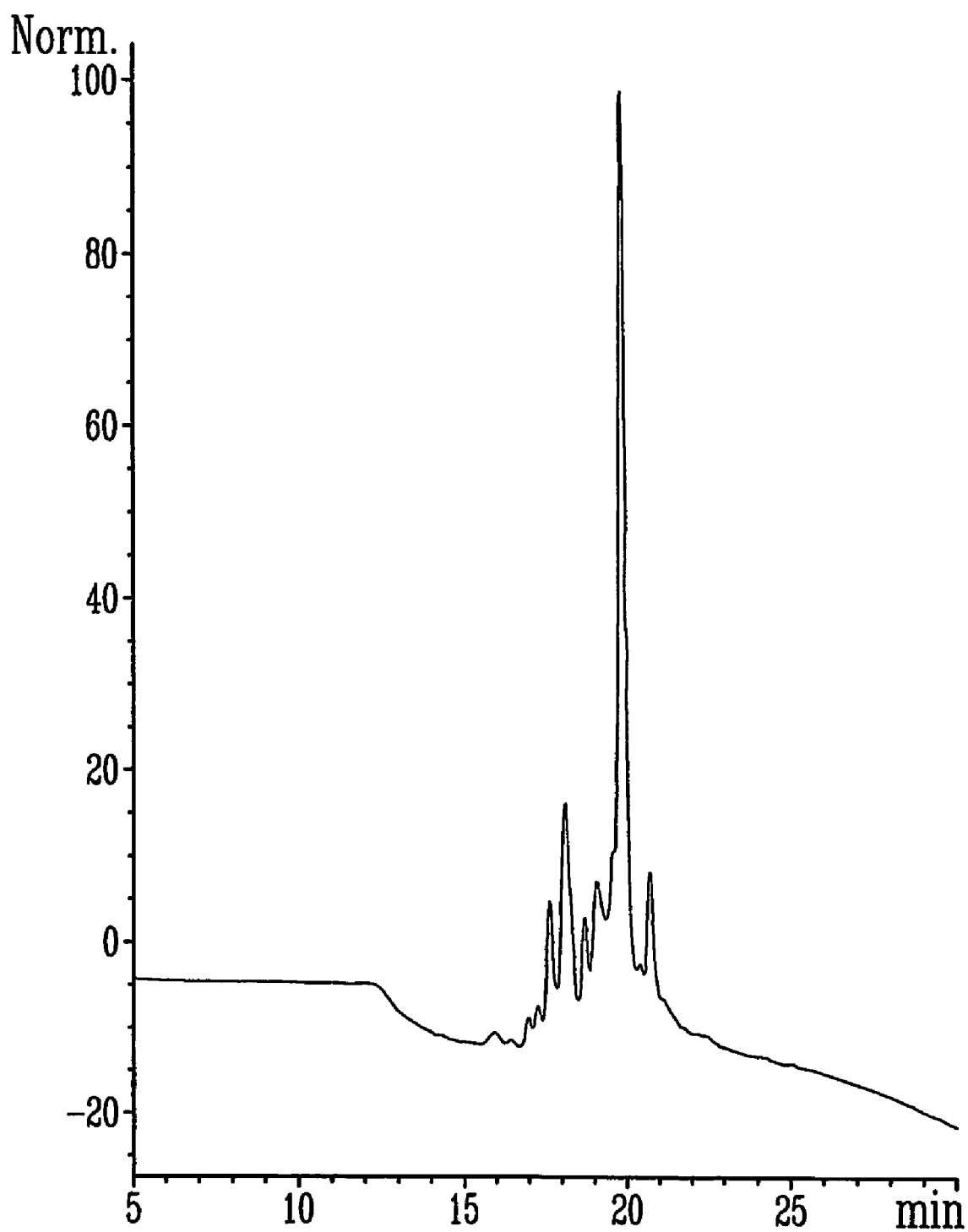
FIG. 4 is a chromatogram showing the purity obtained during a synthesis of a compound when using still another commercial resin.
Figure 5:
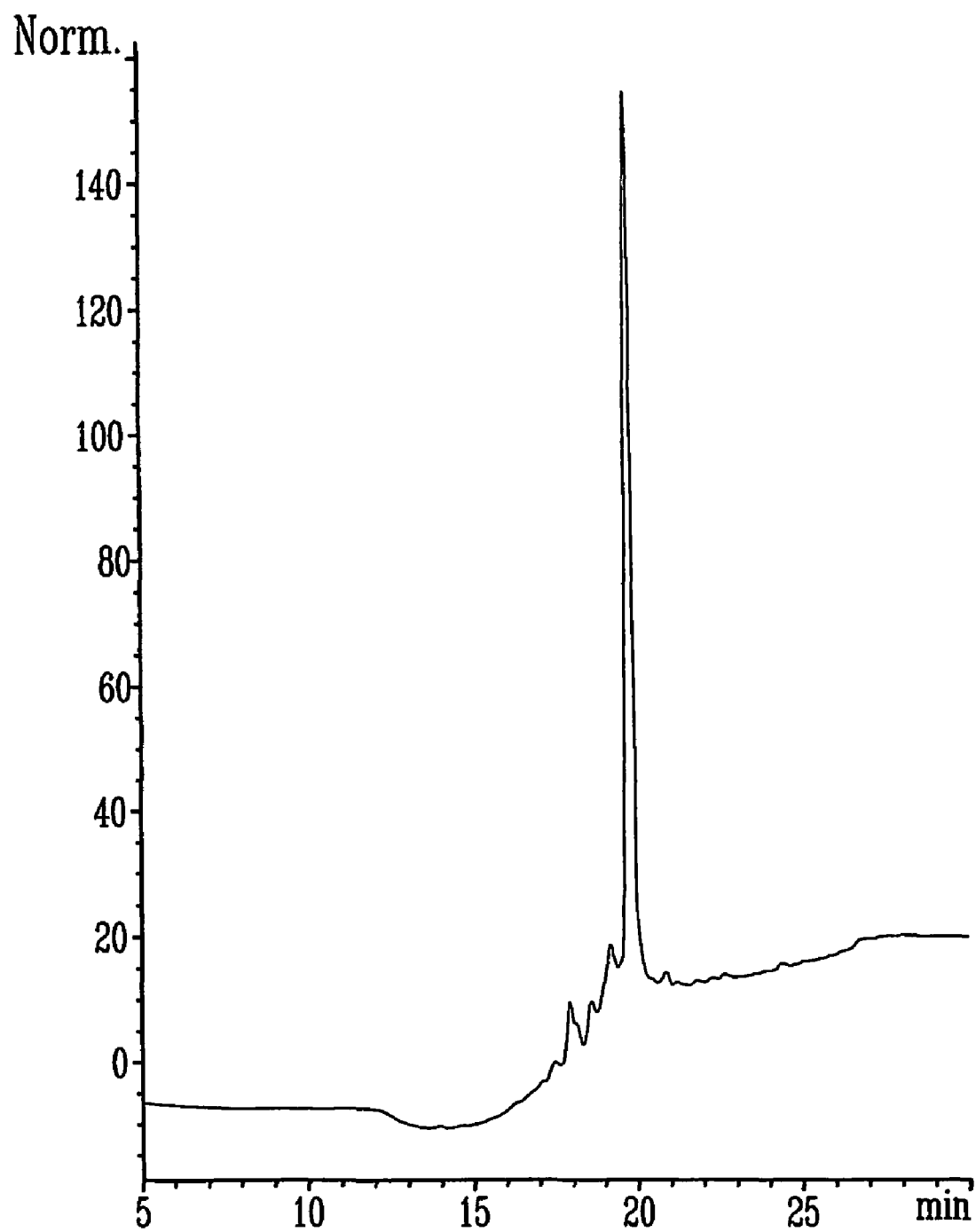
FIG. 5 is a chromatogram showing the purity obtained during a synthesis of a compound when using a resin according to a preferred embodiment of the invention.

The invention will now be illustrated by means of the following non limiting examples.

EXAMPLE 1

Synthesis of PEG400 bis((α-methyl)vinyl chloride) under PTC Conditions

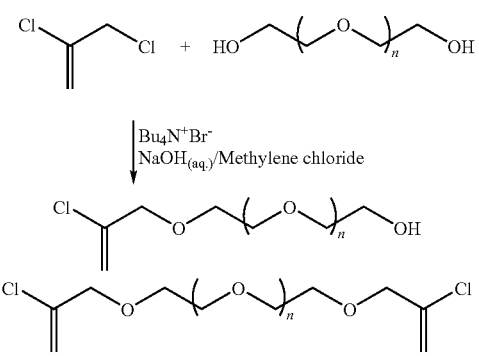

In a round bottom flask of 250 mL, PEG 400 (24 g; 60 mmoles) is dissolved in 75 mL of methylene chloride under mechanical agitation. A solution of sodium hydroxide 33% (150 mL; 50 g; 1250 mmoles) with tetrabutylammonium bromide (TBAB) (19.34 g; 60 mmoles) is added to the organic phase. 2,3-dichloropropene (13.32 g; 120 mmoles) is gently introduced to the biphasic mixture. After 48 h of stirring at room temperature, the organic phase is extracted then dried with $Na_2SO_4$. The purification step is accomplished by means of a silica gel pad (hexanes/acetone: 1/1). The solvent is evaporated to dryness under vacuum. The final product is then dried under vacuum at 40° C. overnight. Yield: 26.78 g. The NMR spectrum shows a ratio between the vinylic protons and the PEG's methylene protons of 50% of mono and bis functionalized PEG 400.

EXAMPLE 2

Synthesis of PEG2000 bis(ethyl(α-methyl)acrylate) under PTC Conditions

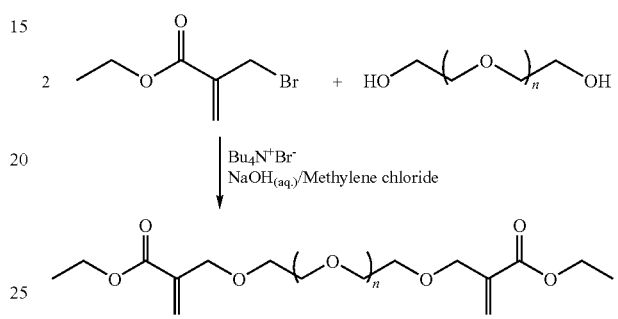

In a round bottom flask of 1 L, PEG 2000 (20.0 g; 10 mmoles) are dissolved in 400 mL of methylene chloride under mechanical agitation. A solution of sodium hydroxide 33% (200 mL; 67.5 g; 1675 mmoles) with tetrabutylammonium bromide (TBAB) (0.645 g; 2 mmoles) is added to the organic phase. Ethyl (bromomethyl)acrylate (7.72 g; 40 mmoles) is gently introduced to the biphasic mixture. After 24-48 h of stirring at room temperature, the organic phase is extracted then dried with $Na_2SO_4$. The solvent is evaporated under vacuum to dryness.

In a round bottom flask of 1 L, under high-speed mechanical agitation, cold diethyl ether (300 mL) is added to the insoluble product and then settled to remove ether by suction. This purification step is repeated three times. The final product is then dried under vacuum at 40° C. overnight. Yield: 20.46 g (92%) The NMR spectrum shows the right ratio between the vinylic protons and the PEG's methylene protons.

EXAMPLE 3

Synthesis of PEG1500 mono & bis(ethyl(α-methyl)acrylate) under Baylis-Hillman Conditions

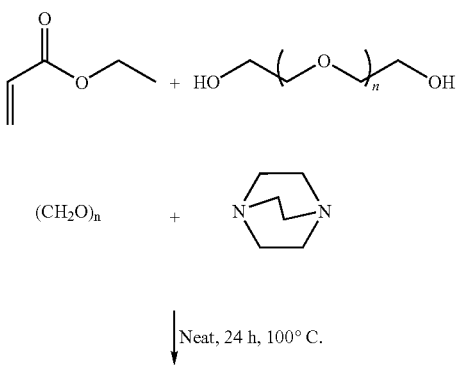

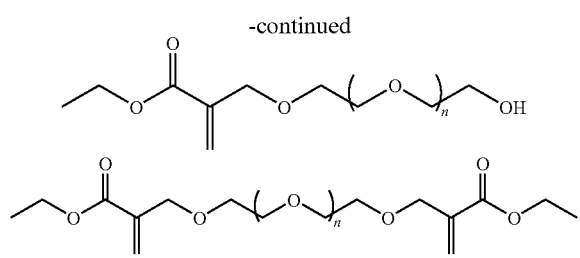

In a round bottom flask of 100 mL, PEG 1500 (15.0 g; 10 mmoles) and DABCO (3.96 g; 35 mmoles) are dissolved in ethyl acrylate (25 mL; 23.1 g; 230 mmoles) under mechanical agitation. At 100° C., paraformaldehyde (3.6 g; 120 mmoles) is added to the organic phase in several portions during 2 hours. After 24 h of stirring at 100° C., the organic phase is cooled to the room temperature. The flask's content is dissolved in 200 mL of acetone. Insoluble matter is filtered and the solvent is evaporated under vacuum to dryness.

The crude product is dissolved with a minimum of methylene chloride (circa 10-20 mL) in a round bottom flask of 500 mL. Under high-speed mechanical agitation, MTBE (300 mL) is added to precipitate the product(s). After 2 hours at 4° C., the precipitate is filtered (MBTE solution is containing impurities) and washed with more MTBE (2×50 mL) and finally with hexanes (3×50 mL). This purification step is repeated twice. The final product is then dried under vacuum at 40° C. overnight. Yield: 14.19 g (82%) The NMR spectrum shows the presence of a mixture of 50% of PEG1500 mono & bis(ethyl α-methyl)acrylate).

EXAMPLE 4

Synthesis of poly(di(ethyl(PEG2000methyl)ester))

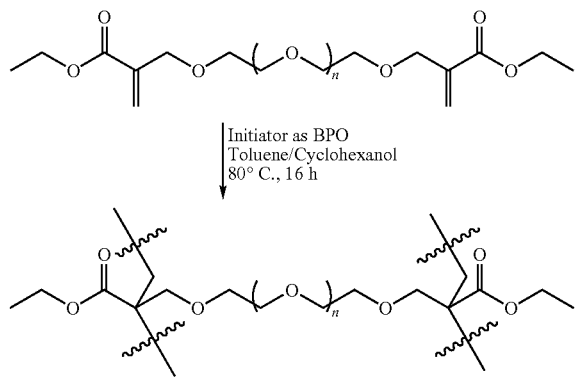

Monomer Phase:
Di(ethyl(PEG2000methyl)acrylate) 22.24 g; 10 mmol)
10.85 mL of cyclohexanol
10.85 mL of toluene
BPO 75% (Benzoyl peroxide) (0.643 g; 2 mmol)

In a 500 mL tri-neck flask, under nitrogen, $MgSO_4 \cdot 7H_2O$ (35.11 g) and 227 mg of sodium dodecylbenzenesulfonate are dissolved in 210 mL of distilled water at 300 r.p.m. at 25° C. A solution of NaOH 50% (15.3 mL) is added slowly to the previous aqueous solution to form the final suspension of $Mg(OH)_2$ media.

In a separate 100 mL Erlenmeyer flask, the monomer phase is prepared by mixing the monomer, porogens (Kita et al., 2001) and initiator. The monomer phase is then poured into the aqueous phase containing the suspending agents and equilibrates for 60 minutes. The polymerization is realized by heating the suspension during 16 h at 80° C. The suspension is cooled and treated with HCl 4N (125 mL; 500 mmoles) then filtered on a Büchner funnel. The resin is then washed with hot distillated water (4×500 mL), acetone (2×250 mL), methanol (2×250 mL) and acetone (2×100 mL). The resin is dried at 40° C. under vacuum overnight. Obtained weight: 20.2 g. Yield: 90%.

EXAMPLE 5

Reduction of the polymethacrylate from Example 4 to the polyol Resin

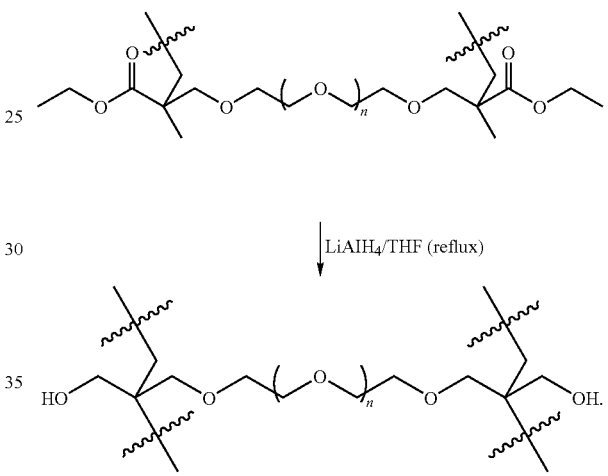

In a 1 L round bottom flask, under dry nitrogen, the polymethacrylate resin from example 4 was swelled in 500 mL of THF with vigorous mechanical agitation. $LiAlH_4$ 1M (50 mL; 50 mmoles) was added carefully. After refluxing during 16 h, the suspension is cooled and n-butanol (100 mL) is slowly added to quench the reaction. The final mixture is filtered on a Büchner funnel. The resin is rinsed with THF, distilled water, HCl 6N, distilled water, acetone and methylene chloride (3×500 mL each). The resin is dried at 40° C. under vacuum overnight. The IR spectrum shows the disappearance of the ester (at 1734 $cm^{-1}$) to give strong absorbance of the OH at 3550 $cm^{-1}$. The loading of the final resin is 0.8 mmol/g (by nitrogen elemental analysis), based on the phenyl carbamate derivative (Lee et al., (1995) U.S. Pat. No. 5,466,758 and Park et al., (1997), Tetrahedron Lett., 38, 591-594) from the reaction of phenyl isocyanate (5 equivalents of the expected value) with the polyol in methylene chloride during 16 hours.

The resin was tested for its ability to swell in several solvents in comparison with other commercial resins. The results are shown in FIG. 1. The resin (200 mg) was placed in a syringe of 3.5 mL equipped with a 0.45 um PTFE frit. A chosen solvent (3 mL) was added and the resin was allowed to swell in during 2 minutes before the exhaust of the excess of solvent with the syringe's piston. Once the resin is pressed, the piston is released carefully. The volume occupied by the resin is noted and corrected with the void volume of the PTFE (PTFE=polytetrafluoroethylene) frit (0.15 mL). Therefore, the swelling of the resin is calculated by the mean of the following equation:

Swelling (mL/g): (volume of resin+void volume of frit)/ weight of resin.

The diagram of FIG. 1 shows how the resin of the present invention is superior to the previous commercial resins in almost any solvents. From non polar to polar solvents, the resin swells more than any other on the market (with the exception of toluene for polystyrene which's of similar chemical nature and almost the same for THF). The major advantage of the present invention is possibility to use many solvents known to be "bad solvents" for polystyrene (acetic acid, acetonitrile, dimethylsulfoxide (DMSO), ethanol, methanol, trifluoroacetic acid (TFA) and water. The present resin swells more in water than any other resins. This shows how the resin is versatile for many fields such as biology, chromatography and "green chemistry". This feature allows the use of the resin in aqueous solutions for organic chemistry where inorganic salts are involved.

EXAMPLE 6

Hydrolysis of the polymethacrylate from Example 3 to the poly(carboxylic acid) Resin

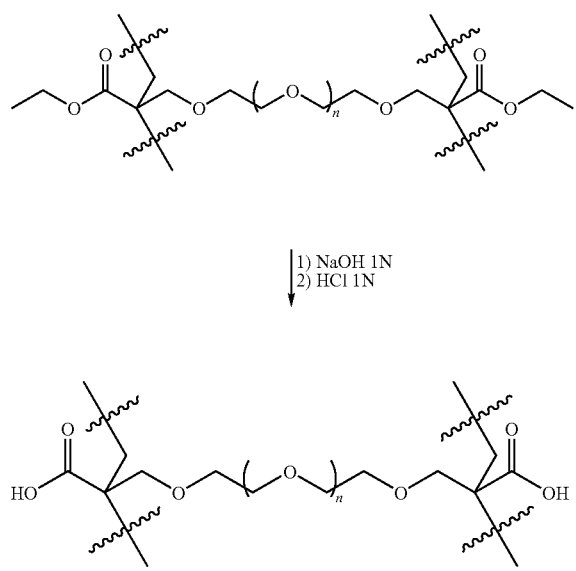

In a 250 mL round bottom flask, 5 g of the polymethacrylate resin from example 3 was hydrolyzed in 100 mL of NaOH 1N with vigorous mechanical agitation during 3 hours at 25° C. The final mixture is filtered on a Büchner funnel. The resin is rinsed with HCl 1N, distilled water, acetone and methylene chloride (3×100 mL each). The resin is dried at 40° C. under vacuum overnight. The IR spectrum shows a strong absorbance of the OH at 3550 cm$^{-1}$. The loading of the final resin is 0.91 mmol/g (by nitrogen elemental analysis), based on the phenyl carbamate derivative from the reaction of phenyl isocyanate (5 equivalents of the expected value) with the poly (carboxylic acid) in methylene chloride during 16 hours.

EXAMPLE 7

Bromination of the polyol from Example 5 to the brominated Resin

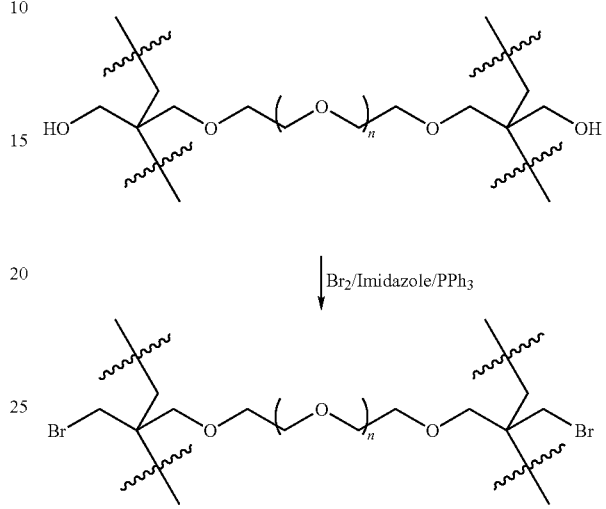

In a 500 mL round bottom flask, under dry nitrogen, the polyol resin (20.3 g; 16.24 mmoles) from example 3 was swelled in 300 mL of methylene chloride with vigorous mechanical agitation. PPh$_3$ (25.02 g; 95.4 mmoles) and imidazole (6.50 g; 95.4 mmoles) were added. At 0° C., bromine (Br$_2$) (15.25 g; 4.89 mL; 95.4 mmoles) was added drop-wise while keeping the temperature below 5° C. Once the addition is completed, the reaction is allowed to stir overnight at 25° C. The final mixture is filtered on a Büchner funnel. The resin is rinsed with methylene chloride, N,N-dimethylformamide, water, Na$_2$SO$_3$ 1M, water, acetone and methylene chloride (3×500 mL each). The resin is dried at 40° C. under vacuum overnight.

The loading of the final resin is 0.5 mmol/g (by nitrogen elemental analysis), based on the reaction of the resin with trimethylamine 40%/water at reflux overnight.

EXAMPLE 8

Wang Type Resin Obtained from the Brominated Resin of the Example 7

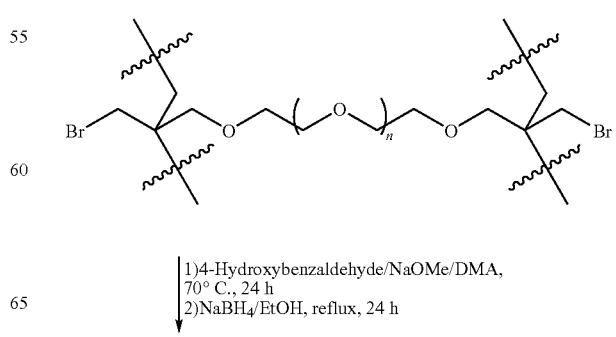

-continued

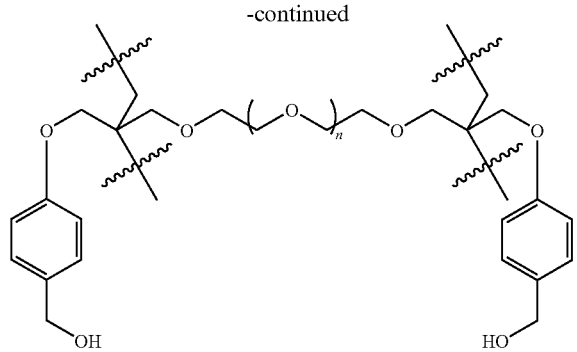

In a 500 mL round bottom flask, under dry nitrogen, the brominated resin (20 g; 10 mmoles) from example 7 was swelled in 400 mL of N,N-dimethylacetamide with vigorous mechanical agitation. 4-Alkoxybenzaldehyde (6.1 g; 50 mmoles) and sodium methoxide (2.7 g; 50 mmoles) were added. The reaction is allowed to stir during 24 hours at 70° C. The final mixture is filtered on a Büchner funnel. The resin is rinsed with N,N-dimethylacetamide, water, HCl 1N, water, acetone and ethanol (3×200 mL each).

The swelled resin in ethanol is directly used as is for its reduction giving the Wang linker. In a 1 L round bottom flask, under dry nitrogen, the 4-Alkoxybenzaldehyde resin (20 g; circa 10 mmoles) was swelled in 500 mL of ethanol with vigorous mechanical agitation. Sodium borohydride (3.78 g; 100 mmoles) were added. The reaction is allowed to stir during 24 hours at reflux. The final mixture is filtered on a Büchner funnel. The resin is rinsed with ethanol, water, HCl 1N, water, acetone and methylene chloride (3×500 mL each).

The loading of the final resin is 0.6 mmol/g (by nitrogen elemental analysis), based on the phenyl carbamate derivative.

EXAMPLE 9

Loading of the Wang Type Resin of Example 8 with Fmoc-Val-OH

In a 25 mL round bottom flask, Fmoc-Val-OH (0.438 g; 1.29 mmol; 2.15 eq.) and anhydrous 1-Hydroxybenzotriazole (HOBt) (0.174 g; 1,29 mmol; 2.15 eq.) are dissolved in 4 mL of degassed N,N-dimethylformamide (DMF). In a separate 50 mL round bottom flask, equipped with a magnetic agitator, Wang resin (from example 8) (1.0 g; 0.6 mmol; 1 eq.) is swelled in 20 mL of degassed DMF at 0° C. The solution of Fmoc-Val-OH/HOBt, then N,N'-diisopropylcarbodiimide (DIC) (0.163 g; 0.202 mL; 1.29 mmol; 2.15 eq.) are added the suspension of resin at 0° C. A solution of N,N-dimethylaminopyridine (DMAP) (0.011 g; 0.086 mmol; 0.067 eq.) in 1 mL of DMF in then added to the suspension. The reaction is allowed to stir during 3 hours at 25° C. A mixture of 1 mL of pyridine with 0.75 mL of acetic anhydride is added to the suspension for the capping of residual hydroxyl groups of the resin. The reaction is allowed to stir for another additional hour at 25° C. The final suspension is filtered on a Büchner funnel. The resin is rinsed with DMF, methanol, methylene chloride (3×20 mL each). The resin is dried at 30° C. overnight under vacuum.

The substitution of the resulting resin is 0.15 mmol/g (measured by the UV spectrophotometric analysis of the fulvene-piperidine adduct.) It should be noted that the example 9 could be further optimized. In particular, the loading of such a resin can be further improved.

EXAMPLE 10

Synthesis of the retroacyl Carrier (74-65) (GNTYDIAAQV) with the Resin of Example 9 and Other Commercial Resins (see FIGS. 2 to 5)

The parallel synthesis of the peptide is performed on the following resins on a 0.1 mmol scale using the FASTMOC® methodology on an Applied BIOSYSTEMS® 433A Peptide Synthesizer using 10 equivalents of the reagents and amino acids in NMP during 45 minutes. Only single couplings were performed. The resins employed in this test were: resin of example 9:0.15 mmol/g; Wang-Polystyrene-Val-Fmoc: 0.27 mmol/g; TentaGel S PHB-Val-Fmoc (FLUKA (trade-mark); lot: WA10225): 0.22 mmol/g; CLEAR®-Val-Fmoc (PEPTIDES INTERNATIONAL (trade-mark); lot 215531): 0.49 mmol/g.

FASTMOC cycles were used with HBTU/HOBt as the coupling reagents. All Fmoc amino acids were commercially available. Deprotection steps were done with piperidine 20%/NMP (3×2 minutes minimum). The peptides were cleaved from the resin using 5 mL of 95% trifluoroacetic acid, 2.5% thioanisole, 1.25% ethanedithiol, and 1.25% water for 2 hours. The crude peptides in solution were precipitated with cold diethyl ether (5 times) and then centrifugated. The solids were dissolved in TFA 0.1%/water and lyophilized for 48 hours.

The HPLC runs were performed on a AQUAPORE (trade-mark) RP-300 $C_{18}$ reversed-phase column (1×50 mm) at 50 μL/min using the following pattern:

Mobile phase A: 0.1% TFA in water
Mobile phase B: 80% acetonitrile, 19.92% water, and 0.08% TFA
0-5 minutes: 100% A;
5-30 minutes: 100% A to 100% B in 25 minutes;
30-40 minutes: 100% B.

The samples were previously dissolved in TFA 0.1%/water before injection. The volume injected for each run was 3 μL. The detection of the peptides was made at 215 nm.

The obtained results are shown in FIGS. 2 to 5 and are resumed in Table 1.

TABLE 1

| Resins | Purity of the crude peptide |
|---|---|
| Polystyrene (FIG. 2) | 9% |
| TENTAGEL (FIG. 3) | 61% |
| CLEAR (FIG. 4) | 62% |
| Example 9 (FIG. 5) | 92% |

The chromatograms of FIGS. 2 to 5 show the effectiveness of the present invention as compared to commercial resins. For the peptide chemistry, this allows the synthesis of difficult peptide sequence as the one here presented. Moreover, only single couplings were performed instead of double (to triple!) couplings for many synthesis of the same peptide with different resins in the past. This fact is a tremendous advantage for this type of chemistry because it gives higher purity products and then diminishes the need of tedious and costly purifications on analytical and/or preparative columns. Furthermore, the chromatogram of the crude peptide (of the resin of example 9) is showing the absence of "little shoulders" found with other resins herein presented. This is the main problem encountered during the purification step of the crude peptide in peptide chemistry because the separation is often "impossible".

The mass spectra (MALDI-TOF, VOYAGER DE PRO (trade-marks)) of each peptide were performed showed the presence of the desired peptide (in its ionized form).

Polystyrene: $[M+Na]^+$: 1085.4659 (only)
TENTAGEL: $[M+H]^+$: 1063.3026; $[M+Na]^+$: 1085.3520.
CLEAR: $[M+H]^+$: 1063.3374; $[M+Na]^+$: 1085.3204.
Example 9: $[M+H]^+$: 1063.5607; $[M+Na]^+$: 1085.5569.

It has thus been demonstrated that the polyethers of the present invention are very useful and have interesting properties. Indeed, theses polyethers of the present invention, and particularly the ones based on vinyl monomers and cross-linkers, can be easily prepared through radical polymerisation in suspension polymerization or not. They can also easily prepared on a large scale such as polystyrenes. This feature is very interesting because it allows the industrial manufacture of theses polyethers. The polyethers of the prior art based on standard polyacrylates are not chemically stable as the ones of the present invention.

These cross-linked polyethers also have very good swelling properties. This feature is very interesting because it allows the use of theses polyethers in almost any organic to aqueous medium. This is not encountered with commercial polystyrenes and for a few other commercial "amphiphiles" resins (which are not swelling as far as the polyethers of the present invention.) Moreover, the ability of the present polyethers to swell in water enable its use in biology, "green chemistry", and chemistry based on supported enzymes. The latter needs a highly porous resin to accommodate the three dimensional structure of the enzyme without affecting its activity.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

The invention claimed is:

1. A cross-linked polyether which is obtained by polymerizing a monomer of the general formula:

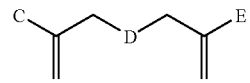

wherein
D is PEG, PPG, or poly(THF), and
C and E independently represent an aldehyde, wherein all the monomers of the cross-linked polyether are identical.

2. A method for preparing a cross-linked polyether, comprising the step of polymerizing a monomer of the general formula:

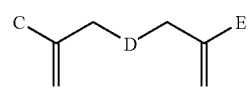

wherein
D is PEG, PPG, or poly(THF), and
C and E independently represent an aldehyde, wherein all the monomers of the cross-linked polyether are identical.

* * * * *